(12) United States Patent
Hibbard

(10) Patent No.: US 7,187,800 B2
(45) Date of Patent: Mar. 6, 2007

(54) METHOD AND APPARATUS FOR IMAGE SEGMENTATION USING JENSEN-SHANNON DIVERGENCE AND JENSEN-RENYI DIVERGENCE

(75) Inventor: Lyndon S. Hibbard, St. Louis, MO (US)

(73) Assignee: Computerized Medical Systems, Inc., St. Louis, MO (US)

( * ) Notice: Subject to any disclaimer, the term of this patent is extended or adjusted under 35 U.S.C. 154(b) by 644 days.

(21) Appl. No.: 10/211,779

(22) Filed: Aug. 2, 2002

(65) Prior Publication Data

US 2004/0022438 A1    Feb. 5, 2004

(51) Int. Cl.
 G06K 9/34    (2006.01)
(52) U.S. Cl. ..................................... 382/173
(58) Field of Classification Search ................. 382/173
 See application file for complete search history.

(56) References Cited

U.S. PATENT DOCUMENTS

| | | |
|---|---|---|
| 4,125,858 A | 11/1978 | Hounsfield et al. |
| 4,567,896 A | 2/1986 | Barnea et al. |
| 4,586,512 A | 5/1986 | Do-huu et al. |
| 4,751,643 A | 6/1988 | Lorensen et al. |
| 4,764,971 A | 8/1988 | Sullivan |
| 4,791,567 A | 12/1988 | Cline et al. |
| 4,856,074 A | 8/1989 | Nagaoka |
| 4,896,673 A | 1/1990 | Rose et al. |
| 4,961,425 A | 10/1990 | Kennedy et al. |
| 4,991,579 A | 2/1991 | Allen |

(Continued)

FOREIGN PATENT DOCUMENTS

EP    0 424 912    5/1991

(Continued)

OTHER PUBLICATIONS

Bozkurt; "Curve and Polygon Evolution Techniques for Image Processing", North Carolina State University PHD dissertation, Jun. 11, 2002, CH.4 p. 50-87.*

(Continued)

Primary Examiner—Joseph Mancuso
Assistant Examiner—Jordan Kuhn
(74) Attorney, Agent, or Firm—Thompson Coburn, LLP

(57) ABSTRACT

A method of approximating the boundary of an object in an image, the image being represented by a data set, the data set comprising a plurality of data elements, each data element having a data value corresponding to a feature of the image, the method comprising determining which one of a plurality of contours most closely matches the object boundary at least partially according to a divergence value for each contour, the divergence value being selected from the group consisting of Jensen-Shannon divergence and Jensen-Renyi divergence. Each contour $C^i$ defines a zone $Z_I^i$ and a zone $Z_O^i$, $Z_I^i$ representing the data elements inside the contour and $Z_O^i$ representing the data elements outside the contour, each zone having a corresponding probability distribution of data values for the data elements therein, and wherein the divergence value for each contour $C^i$ represents a measure of the difference between the probability distributions for the zones $Z_I^i$ and $Z_O^i$. The boundary estimate is preferably a parametric contour. Further, the present invention supports the segmentation of multiple objects in a single data set simultaneously.

88 Claims, 10 Drawing Sheets

U.S. PATENT DOCUMENTS

| | | |
|---|---|---|
| 4,994,013 A | 2/1991 | Suthanthiran et al. |
| 5,072,384 A | 12/1991 | Doi et al. |
| 5,133,020 A | 7/1992 | Giger et al. |
| 5,166,876 A | 11/1992 | Cline et al. |
| 5,170,790 A | 12/1992 | Lacoste et al. |
| 5,178,148 A | 1/1993 | Lacoste et al. |
| 5,185,809 A | 2/1993 | Kennedy et al. |
| 5,187,658 A | 2/1993 | Cline et al. |
| 5,204,625 A | 4/1993 | Cline et al. |
| 5,222,499 A | 6/1993 | Allen et al. |
| 5,227,969 A | 7/1993 | Waggener et al. |
| 5,234,004 A | 8/1993 | Hascoet et al. |
| 5,239,591 A | 8/1993 | Ranganath |
| 5,242,373 A | 9/1993 | Scott et al. |
| 5,260,871 A | 11/1993 | Goldberg |
| 5,289,374 A | 2/1994 | Doi et al. |
| 5,299,253 A | 3/1994 | Wessels |
| 5,319,549 A | 6/1994 | Katsuragawa et al. |
| 5,319,551 A | 6/1994 | Sekiguchi et al. |
| 5,339,812 A | 8/1994 | Hardy et al. |
| 5,371,810 A | 12/1994 | Vaidyanathan |
| 5,389,101 A | 2/1995 | Heilbrun et al. |
| 5,391,139 A | 2/1995 | Edmundson |
| 5,391,199 A | 2/1995 | Ben-Haim |
| 5,394,457 A | 2/1995 | Leibinger et al. |
| 5,398,690 A | 3/1995 | Batten et al. |
| 5,409,006 A | 4/1995 | Buchholtz et al. |
| 5,410,617 A | 4/1995 | Kidd et al. |
| 5,411,026 A | 5/1995 | Carol |
| 5,412,563 A | 5/1995 | Cline et al. |
| 5,433,199 A | 7/1995 | Cline et al. |
| 5,447,154 A | 9/1995 | Cinquin et al. |
| 5,452,367 A | 9/1995 | Bick et al. |
| 5,457,754 A | 10/1995 | Han et al. |
| 5,458,126 A | 10/1995 | Cline et al. |
| 5,460,592 A | 10/1995 | Langton et al. |
| 5,491,627 A | 2/1996 | Zhang et al. |
| 5,494,039 A | 2/1996 | Onik et al. |
| 5,517,602 A | 5/1996 | Natarajan |
| 5,526,812 A | 6/1996 | Dumoulin et al. |
| 5,531,223 A | 7/1996 | Hatanaka |
| 5,531,227 A | 7/1996 | Schneider |
| 5,537,485 A | 7/1996 | Nishikawa et al. |
| 5,553,207 A | 9/1996 | Sekiguchi et al. |
| 5,562,095 A | 10/1996 | Downey et al. |
| 5,566,246 A | 10/1996 | Rao |
| 5,570,430 A | 10/1996 | Sheehan et al. |
| 5,574,799 A | 11/1996 | Bankman et al. |
| 5,583,659 A | 12/1996 | Lee et al. |
| 5,590,215 A | 12/1996 | Allen |
| 5,603,318 A | 2/1997 | Heilbrun et al. |
| 5,622,170 A | 4/1997 | Schulz |
| 5,624,382 A | 4/1997 | Oppelt et al. |
| 5,638,819 A | 6/1997 | Manwaring et al. |
| 5,640,496 A | 6/1997 | Hardy et al. |
| 5,660,185 A | 8/1997 | Shmulewitz et al. |
| 5,662,111 A | 9/1997 | Cosman |
| 5,669,382 A | 9/1997 | Curwen et al. |
| 5,672,172 A | 9/1997 | Zupkas |
| 5,682,886 A | 11/1997 | Delp et al. |
| 5,709,206 A | 1/1998 | Teboul |
| 5,715,836 A | 2/1998 | Kliegis et al. |
| 5,727,538 A | 3/1998 | Ellis |
| 5,734,739 A | 3/1998 | Sheehan et al. |
| 5,740,225 A | 4/1998 | Nabatame |
| 5,742,263 A | 4/1998 | Wang et al. |
| 5,749,362 A | 5/1998 | Funda et al. |
| 5,765,561 A | 6/1998 | Chen et al. |
| 5,769,074 A | 6/1998 | Barnhill et al. |
| 5,776,063 A | 7/1998 | Dittrich et al. |
| 5,778,043 A | 7/1998 | Cosman |
| 5,787,886 A | 8/1998 | Kelly et al. |
| 5,797,849 A | 8/1998 | Vesely et al. |
| 5,810,007 A | 9/1998 | Holupka et al. |
| 5,817,022 A | 10/1998 | Vesely |
| 5,820,623 A | 10/1998 | Ng |
| 5,830,145 A | 11/1998 | Tenhoff |
| 5,833,627 A | 11/1998 | Shmulewitz et al. |
| 5,836,954 A | 11/1998 | Heilbrun et al. |
| 5,851,183 A | 12/1998 | Bucholz |
| 5,859,891 A * | 1/1999 | Hibbard ........................ 378/62 |
| 5,860,909 A | 1/1999 | Mick et al. |
| 5,868,673 A | 2/1999 | Vesely |
| 5,868,757 A | 2/1999 | Koutrouvelis |
| 5,871,448 A | 2/1999 | Ellard |
| 5,891,034 A | 4/1999 | Bucholz |
| 5,906,574 A | 5/1999 | Kan |
| 5,928,130 A | 7/1999 | Schmidt |
| 5,931,786 A | 8/1999 | Whitmore, III et al. |
| 5,938,583 A | 8/1999 | Grimm |
| 5,951,571 A | 9/1999 | Audette |
| 5,961,527 A | 10/1999 | Whitmore, III et al. |
| 5,974,165 A | 10/1999 | Giger et al. |
| 5,984,870 A | 11/1999 | Giger et al. |
| 5,989,811 A | 11/1999 | Veltri et al. |
| 6,004,267 A | 12/1999 | Tewari et al. |
| 6,006,126 A | 12/1999 | Cosman |
| 6,007,474 A | 12/1999 | Rydell |
| 6,025,128 A | 2/2000 | Veltri et al. |
| 6,027,446 A | 2/2000 | Pathak et al. |
| 6,033,357 A | 3/2000 | Ciezki et al. |
| 6,036,632 A | 3/2000 | Whitmore, III et al. |
| 6,038,467 A | 3/2000 | De Bliek et al. |
| 6,048,312 A | 4/2000 | Ishrak et al. |
| 6,083,166 A | 7/2000 | Holdaway et al. |
| 6,083,167 A | 7/2000 | Fox et al. |
| 6,095,975 A | 8/2000 | Silvern |
| 6,102,844 A | 8/2000 | Ravins et al. |
| 6,102,867 A | 8/2000 | Dietz et al. |
| 6,129,670 A | 10/2000 | Burdette et al. |
| 6,140,065 A | 10/2000 | Carlson et al. |
| 6,146,390 A | 11/2000 | Heilbrun et al. |
| 6,165,181 A | 12/2000 | Heilbrun et al. |
| 6,167,296 A | 12/2000 | Shahidi |
| 6,179,768 B1 | 1/2001 | Loffler et al. |
| 6,196,963 B1 | 3/2001 | Williams |
| 6,196,964 B1 | 3/2001 | Loffler et al. |
| 6,206,832 B1 | 3/2001 | Downey et al. |
| 6,208,832 B1 | 3/2001 | Remschel |
| 6,210,315 B1 | 4/2001 | Andrews et al. |
| 6,213,110 B1 | 4/2001 | Christopher et al. |
| 6,213,932 B1 | 4/2001 | Schmidt |
| 6,226,543 B1 | 5/2001 | Gilboa et al. |
| 6,236,875 B1 | 5/2001 | Bucholz et al. |
| 6,238,342 B1 | 5/2001 | Feleppa et al. |
| 6,241,670 B1 | 6/2001 | Nambu |
| 6,249,594 B1 * | 6/2001 | Hibbard ........................ 382/128 |
| 6,261,219 B1 | 7/2001 | Meloul et al. |
| 6,266,453 B1 | 7/2001 | Hibbard et al. |
| 6,270,472 B1 | 8/2001 | Antaki et al. |
| 6,301,495 B1 | 10/2001 | Gueziec et al. |
| 6,311,084 B1 | 10/2001 | Cormack et al. |
| 6,325,758 B1 | 12/2001 | Carol et al. |
| 6,332,888 B1 | 12/2001 | Levy et al. |
| 6,354,989 B1 | 3/2002 | Nudeshima |
| 6,358,195 B1 | 3/2002 | Green et al. |
| 6,361,487 B1 | 3/2002 | Green et al. |
| 6,366,796 B1 | 4/2002 | Yanof et al. |
| 6,379,302 B1 | 4/2002 | Kessman et al. |
| 6,387,034 B1 | 5/2002 | Lee |
| 6,387,035 B1 | 5/2002 | Jung, Jr. et al. |
| 6,416,492 B1 | 7/2002 | Nielson |
| 6,423,009 B1 | 7/2002 | Downey et al. |
| 6,425,865 B1 | 7/2002 | Salcudean et al. |

| | | |
|---|---|---|
| 6,454,696 B1 | 9/2002 | Kindlein et al. |
| 6,490,475 B1 | 12/2002 | Seeley et al. |
| 6,500,109 B2 | 12/2002 | Tokita et al. |
| 6,512,942 B1 | 1/2003 | Burdette et al. |
| 6,572,525 B1 | 6/2003 | Yoshizumi |
| 6,612,991 B2 | 9/2003 | Sauer et al. |
| 6,766,036 B1 | 7/2004 | Pryor |
| 6,775,404 B1 | 8/2004 | Pagoulatos et al. |
| 2001/0029334 A1 | 10/2001 | Graumann et al. |
| 2002/0077546 A1 | 6/2002 | Aldefeld et al. |
| 2002/0087080 A1 | 7/2002 | Slayton et al. |
| 2003/0074011 A1 | 4/2003 | Gilboa et al. |
| 2003/0132947 A1* | 7/2003 | Luo .......................... 345/619 |

FOREIGN PATENT DOCUMENTS

| | | |
|---|---|---|
| EP | 0 455 439 A2 | 11/1991 |
| WO | WO 91/07726 | 5/1991 |
| WO | WO 96/10949 | 4/1996 |
| WO | WO 96/11624 | 4/1996 |
| WO | WO 96/42070 | 12/1996 |
| WO | WO 98/39736 | 9/1998 |
| WO | WO 00/14668 | 3/2000 |
| WO | WO 00/63658 | 10/2000 |
| WO | WO 01/06924 | 2/2001 |
| WO | WO 01/87164 | 11/2001 |
| WO | WO 01/95795 | 12/2001 |
| WO | WO 02/44749 | 6/2002 |

OTHER PUBLICATIONS

Hamza et al.; "An Information Divergence Measure for ISAR Image Registration", IEEE, 2001.*
Hibbard; "Maximum a posteriori Segmentation for Medical Visualization", Workshop on Biomedical Image Analysis, 1998, p. 93-102.*
Atae-Allah et al.; "Image Segmentation by Jensen-Shannon Divergence—Application to Measurement of Interfacial Tension", IEEE, 2000.*
Gomez-Lopera et al.; "An Analysis of Edge Detection by using the Jensen-Shannon Divergence", Journal of Mathematical Imaging and Vision, 2000, p. 35-56.*
Barranco-Lopez et al.; "Entropic texture-edge detection for image segmentation", Electronics Letters vol. 31 No. 11, May 1995.*
Unal et al.; "A Vertex-Based Representation of Objects in an Image", IEEE ICIP 2002.*
Unal et al.; "Active Polygons for Object Tracking", 1 st Int. Symp. 3D Data Processing, Visualization, Transmission, Jun. 2002.*
Hibard; "Image Segmentation using information theoretic criteria", Proceedings of the SPIE, vol. 5032, 2003, p. 1639-1649.*
Hamza et al.; "Image Registration and Segmentation by Maximizing the Jensen-Renyi Divergence", EMMCVPR 2003, p. 147-163.*
Statistical Independence Definition from Wikipedia.*
Anuta, P.E., Oct. 1970 IEEE Transactions on Geoscience Electronics, vol. GE-8, No. 4, "Spatial Registration of Multispectrical and Multitemporal Digital Imagery using Fast Fourier Transform Techniques", pp. 353-368.
Barnea and Silverman, Feb. 1972 IEEE Transactions on Computers, vol. C-21, No. 2, "A Class of Algorithms for Fast Digital Image Registration", pp. 179-186.
Bezdek et al.; "Review of MR image segmentation techniques using pattern recognition"; Medical Physics; vol. 20(4); pp. 1033-1048; 1993.
Brown, L.G., Dec. 1992 ACM Computing Surveys vol. 24 No. 4, "A Survey of Image Registration Techniques", pp. 325-376.
Chakraborty et al.; Deformable boundary finding in medical images by integrating gradient and region information; IEEE Transactions on Medical Imaging; vol. 15; pp. 859-870; 1996.
Cline et al. "3D reconstruction of the brain from magnetic resonance images using a connectivity algorithm"; Magnetic Resonance Imaging; vol. 5; pp. 345-352; 1987.
Cline et al.; "Three-dimensional segmentation of MR images of the head using probability and connectivity"; Journal of Computer Assisted Tomography; vol. 14(6); pp. 1037-1045; 1990.

Cline et al.; "Vascular morphology by three-dimensional magnetic resonance imaging"; Magnetic Resonance Imaging; vol. 7; pp. 45-54; 1989.
Collignon, A., et al., Apr. 1995 Proc. of the Xvth Int'l. Conf. On Computer Vision, Virtual Reality, and Robotics in Medicine (CVRMed '95), vol. 905, "Automated Multi-Modality Image Registration Based On Information Theory", pp. 263-274.
Decarli et al.; "Method for quantification of brain, ventricular, and subarachnoid CSF volumes from MR images"; Journal of Computer Assisted Tomography; vol. 16(2); pp. 274-284; 1992.
Delagnes et al.; "Active contours approach to object tracing in image sequences with complex background"; Pattern recognition Letters; vol. 16(2); pp. 171-178; 1995.
Duda, Hart and Stork; Pattern Classification; 2001; pp. 517-599; Second Edition, Chapter 10; John Wiley & Sons, Inc., New York.
Fletcher et al.; A multispectral analysis of brain tissues; Magnetic Resonance in Medicine; vol. 29; pp. 623-630; 1993.
Gomez-Lopera J F et al.: "An analysis of edge detection by using the Jensen-Shannon divergence" Journal of Mathematical Imaging and Vision, vol. 13, No. 1, Aug. 2000, pp. 35-56, XP008033153 Kluwer Academic Publishers, Netherlands ISSN: 0924-9907 the whole document.
Hibbard, et al., Jun. 26, 1987 Science vol. 236, "Three-Dimensional Representation and Analysis of Brain Energy Metabolism", pp. 1641-1646.
Höhne et al.: "Interactive 3D segmentation of MRI and CT volumes using morphological operations"; Journal of Computer Assisted Tomography; vol. 16(2); pp. 285-294; 1992.
Holupka et al.; "Ultrasound image fusions for external beam radiotherapy for prostate cancer"; Int. J. Radiation Oncology Biol. Phys.; vol. 35, No. 5; pp. 975-984; 1996; Elsevier Science Inc., USA.
Kohn et al.; "Analysis of brain and cerebrospinal fluid volumes with MR imaging"; Radiology; vol. 178; pp. 115-122; 1991.
Maes, F., et al., Jun. 1996 IEEE Proceedings of MMBIA, "Multi-Modality Image Registration by Maximization of Mutual Information", pp. 14-22.
McInerney et al.: Deformable models in medical image analysis; Proceedings of Mathematical Methods Biomedical Image Analysis; pp. 171-180; 1996.
Miller et al.; Mathematical textbook of deformable neuroanatomies; Proceedings of the National Academy of Sciences USA; vol. 90; pp. 11944-11948; 1993.
Neal et al.; "Technical Note: Evaluation of a region growing algorithm for segmenting pelvic computed tomography images during radiotherapy planning"; The British Journal of Radiology; vol. 67; pp. 392-395; 1994.
Pelizzari, C.A., et al., Jan./Feb. 1989 Journal of Computer Assisted Tomography, vol. 13, No. 1, "Accurate Three-Dimensional Registration of CT, PET, and/or MR Images of the Brain", pp. 20-26.
Pietrzuk, U. et al.; "An Interactive technique for three-dimensional image registration: validation for PET, SPECT, MRI and CT brain studies"; The Journal of Nuclear Medicine; vol. 35, No. 12; Dec. 1994; pp. 2011-2018.
Pietrzuk, U. et al.; "Three-dimensional alignment of functional and morphological tomograms"; Journal of Computer Assisted Tomography; Jan.-Feb. 1990; vol. 14, No. 1; pp. 51-59; USA.
Pratt, W.K., May 1974 IEEE Transactions on Aerospace and Electronic Systems, vol. AES-10, No. 3, "Correlation Techniques of Image Registration", pp. 353-358.
Rosenman, J.G., et al., 1998 Int. J. Radiation Oncology Biol. Phys., vol. 40, No. 1, "Image Registration: An Essential Part of Radiation Therapy Treatment Planning", pp. 197-205.
Studholme, C., et al., 1996 Medical Image Analysis, vol. 1, No. 2, "Automated 3-D Registration of MR and CT Images of the Head", pp. 163-175.
Toennies, K. D. et al.; "Registration of 3D objects and surfaces"; IEEE Computer Graphics and Applications; vol. 10, No. 3; May 1, 1990; pp. 52-62; New York.
Unal G et al.: "Active polygons for object tracking" proceedings First International Symposium on 30 Data Processing Visualization and Transmission, Padova, Italy, Jun. 19-21, 2002, pp. 696-699, XP002290194 2002, Los Alamitos, CA, USA, IEEE Comput. Sox, USA ISBN: 0-7695-1521-5 sections 2,3.

Vaidyanathan et al.; "Comparison of supervised MRI segmentation methods for tumor volume determination during therapy"; Magnetic Resonance Imaging; vol. 13(5); pp. 719-728; 1995.

Van Den Elsen, P.A., et al., Mar. 1993 IEEE Engineering in Medicine and Biology, "Medical Image Matching—A Review with Classification", pp. 26-39.

Van Herk, M., et al., Jul. 1994 Medical Physics, vol. 21, No. 7, "Automatic Three-Dimensional Correlation of CT-CT, CT-MRI, and CT-SPECT Using Chamfer Matching", pp. 1163-1178.

Viola, P., et al. Jun. 1995 Proc of the Vth int'l Conf. On Computer Vision, "Alignment by Maximization of Mutual Information", pp. 16-23.

Wells et al.; "Adaptive segmentation of MRI data"; IEEE Transactions on Medical Imaging; vol. 15, No. 4; pp. 429-442; 1996.

Yin et al.; "Comparison of bilateral-subtraction and single-image processing techniques in the computerized detection of mammographic masses"; Investigative Radiology; vol. 28(6); pp. 473-481; 1993.

Haralick and Shapiro; "Image Segmentation Techniques"; *Computer Vision, Graphics, and Image Processing*; 1985; pp. 100-132; vol. 29.

Pal and Pal; "A Review on Image Segmentation Techniques"; *Pattern Recognition*; 1993; pp. 1277-1294; vol. 26, No. 9; Great Britain.

Tang and Ma; "General Scheme of Region Competition Based on Scale Space";*IEEE Transactions on Pattern Analysis and Machine Intelligence* ; Dec. 2001; pp. 1366-1378; vol. 23, No. 12.

Rosenfeld and Kak; *Digital Picture Processing*; 1982; pp. 55-190; Second Edition, vol. 2, Chapter 10; Academic Press, New York.

Beveridge, Griffith, kohler, Hanson and Riseman; "Segmenting Images Using Localized Histograms and Region Merging"; *International Journal of Computer Vision*; 1989; pp. 311-347; vol. 2; Kluwer Academic Publishers, Boston.

Adams and Bischof; "Seeded Region Growing"; *IEEE Transactions on Pattern Analysis and Machine Intelligence*; Jun. 1994; pp. 641-647; vol. 16, No. 6.

Ballard and Brown; *Computer Vision*; 1982; pp. 119-165; Chapters 4-5; Prentice-Hall, Inc., Englewood Cliffs, New Jersey.

Kass, Witkin and Terzopoulos; "Snakes: Active Contour Models"; *International Journal of Computer Vision*; 1988; pp. 321-331; vol. 1, No. 4; Kluwer Academic Publishers, Boston.

Cohen; "On Active Contour Models and Ballons"; *CVGIP: Image Understanding*, Mar. 1991; pp. 211-218; vol. 53, No. 2; Academic Press, Inc.

Malladi, Sethian and Vemuri; "Shape Modeling with Front Propagation: A Level Set Approach"; *IEEE Transactions on Pattern Analysis and Machine Intelligence*; Feb. 1995; pp. 158-175; vol. 17, No. 2.

Devroye, Györfi and Lugosi; *A Probabilistic Theory of Pattern Recognition*; 1996; pp. 9-20, 61-90; Chapters 2, 5; Springer-Verlag New York, Inc.

Duda, Hart and Stork; *Pattern Classification*; 2001; pp. 20-83, 161-214; Second Edition, Chapters 2, 4; John Wiley & Sons, Inc., New York.

Witten and Frank; *Data Mining, Practical Machine Learning Tools and Techniques with Java Implementations*; 2000; pp. 157-227; Chapter 6; Morgan Kaufmann Publishers, San Francisco, CA.

Duda, Hart and Stork; *Pattern Classification* ; 2001; pp. 517-599; Second Edition, Chapter 10; John Wiley & Sons, Inc., New York.

Besag; "On the Statistical Analysis of Dirty Pictures"; *Journal of the Royal Statistical Society*; 1986; pp. 259-279; vol. 48, No. 3.

Geman and Geman; "Stochastic Relaxation, Gibbs Distributions, and the Bayesian Restoration of Images"; *IEEE Transactions on Pattern Analysis and Machine Intelligence*; Nov. 1984, pp. 721-741; vol. PAMI-6, No. 6.

Staib and Duncan; "Boundary Finding with Parametrically Deformable Models"; *IEEE Transactions on Pattern Analysis and Machine Intelligence*; Nov. 1992; pp. 1061-1075; vol. 14, No. 11.

Chakraborty, Staib and Duncan; "Deformable Boundary Finding in Medical Images by Integrating Gradient and Region Information"; *IEEE Transactions on Medical Imaging* ; Dec. 1996; pp. 859-870; vol. 15, No. 6.

Giardina and Kuhl; "Accuracy of Curve Approximation by Harmonically Related Vectors with Elliptical Loci"; *Computer Graphics and Image Processing*; 1977; pp. 277-285; vol. 6; Academic Press, Inc.

Kuhl and Giardina; "Elliptic Fourier Features of A Closed Contour"; *Computer Graphics and Image Processing*; 1982; pp. 236-258; vol. 18; Academic Press, Inc.

Hibbard; "Maximum a *posteriori* Segmentation for Medical Visualization"; IEEE Workshop on Biomedical Image Analysis (WBIA98), Santa Barbara, CA; Jun. 1998; pp. 93-102.

Shannon; "A Mathematical Theory of Communication"; *The Bell System Technical Journal*; Jul., Oct. 1948; pp. 379-423, 623-656; vol. 27.

Cover and Thomas; *Elements of Information Theory*; 1991; pp. 12-42, 279-332; Chapters 2, 12; John Wiley & Sons, Inc., New York.

Kullback and Leibler; "On Information and Sufficiency"; *Annals of Mathematical Statistics*; 1951; pp. 79-86; vol. 22.

Kullback; *Information Theory and Statistics* ; 1959; pp. 1-35; Chapters 1, 2; Dover Publications, Inc., Mineola, New York.

Van Trees; *Detection, Estimation, and Modulation Theory, Part I Detection, Estimation, and Linear Modulation Theory*; 1968; pp. 19-165; Chapter 2; John Wiley & Sons, Inc., New York.

Duda and Hart; *Pattern Classification and Scene Analysis*; 1973; pp. 10-39; Chapter 2; John Wiley & Sons, Inc., New York.

Fukunaga; *Introduction to Statistical Pattern Recognition*; 1990; pp. 51-123; Second Edition, Chapter 3; Academic Press, Inc., San Diego, CA.

Rényi; "On Measures of Entropy and Information"; *Proceedings of the Fourth Berkley Symposium on Mathematical Statistics and Probability*; Berkeley, California, Jun.-Jul. 1960; Published 1961; pp. 547-561; vol. I; University of California Press.

Rényi; "Some Fundamental Questions of Information Theory"; *Selected Papers of Alfred Rényi*; 1976; pp. 526-552; vol. 2; Akademia Kiado, Budapest.

Principe; Xu and Fisher; "Information-Theoretic Learning" in *Unsupervised Adaptive Filtering*; 1999; pp. 265-319; Wiley, New York.

Lin; "Divergence Measures Based on the Shannon Entropy"; *IEEE Transactions on Information Theory*; Jan. 1991; pp. 145-151; vol. 37, No. 1.

He, Hamza and Krim; "An Information Divergence Measure for ISAR Image Registration"; IEEE Workshop on Statistical Signal Processing; Aug. 2001; Singapore.

Grimmett and Stirzaker; *Probability and Random Processes*; pp. 1-21; Second Edition, Chapter 1; Oxford University Press, Oxford.

Press, Teukolsky, Vetterling and Flannery; *Numerical Recipes in C++. The Art of Scientific Computing*; 2002; pp. 398-429; Second Edition; Chapter 10; Cambridge University Press, Cambridge, UK.

Nocedal and Wright; *Numerical Optimization*; 1999; pp. 10-63; Chapters 2,3; Springer-Verlag New York, Inc.

* cited by examiner

A CT digital image of the left kidney (left), with edges of the anatomy emphasized (center), and contoured with a dashed line representing the kidney boundary.

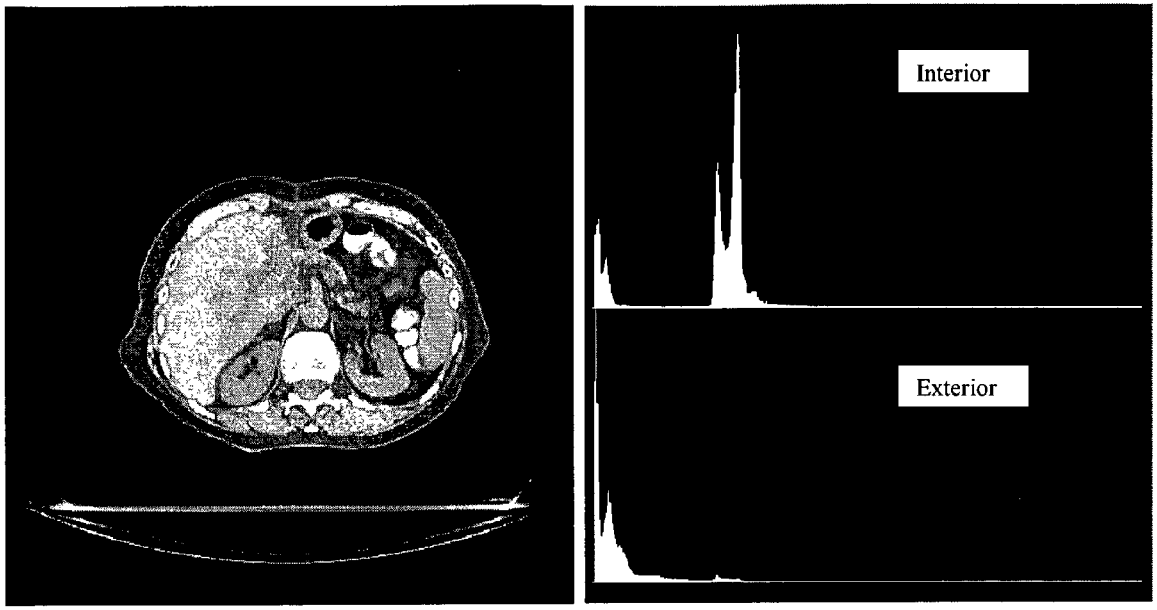

A CT section of the abdomen (left) and accompanying histograms of the pixel intensities (right). The upper histogram is that of the interior of the patient, and the lower histogram corresponds to the image background outside the patient. The Interior histogram has two main densities, one at left corresponding to the dark pixels in the bowel, and the larger twin-peaked density corresponds to the tissues. The Exterior histogram is dominated by the background pixels (leftmost peak) and a succession of smaller peaks at higher CT numbers corresponding to the CT scanner couch and gantry ring which are not visible in the image.

Figure 2

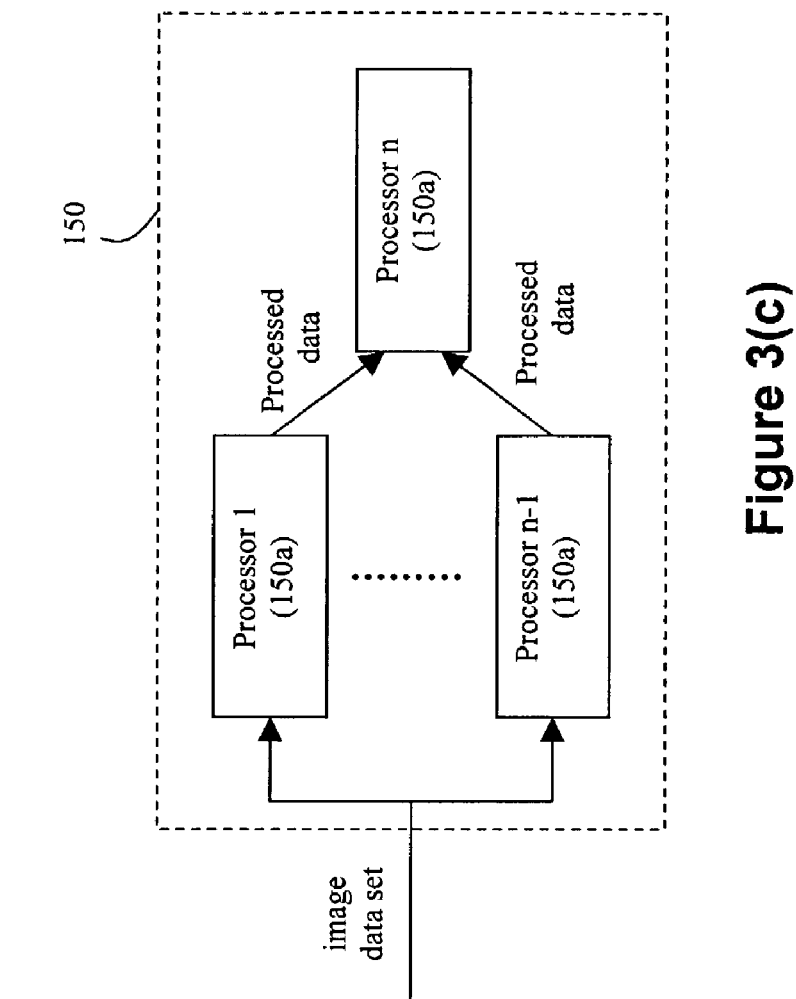
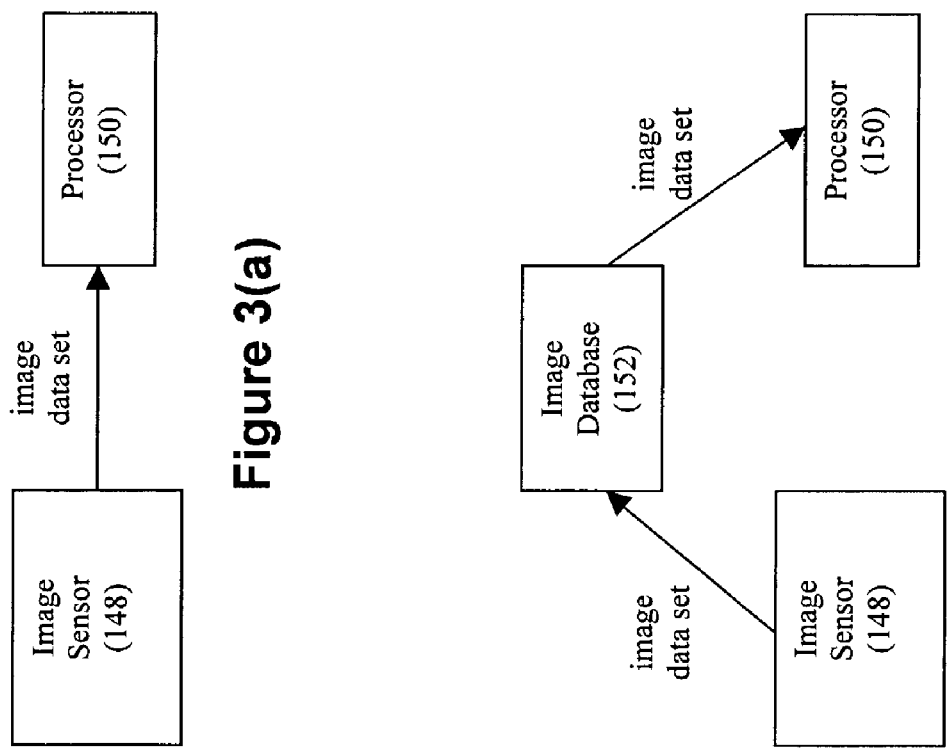
Figure 3(c)
Figure 3(a)
Figure 3(b)

The light-weight polygon is the initial contour estimate, and the thick white curve is the computed contour, formed by the set of parameters c which maximized the Jensen-Renyi divergence.

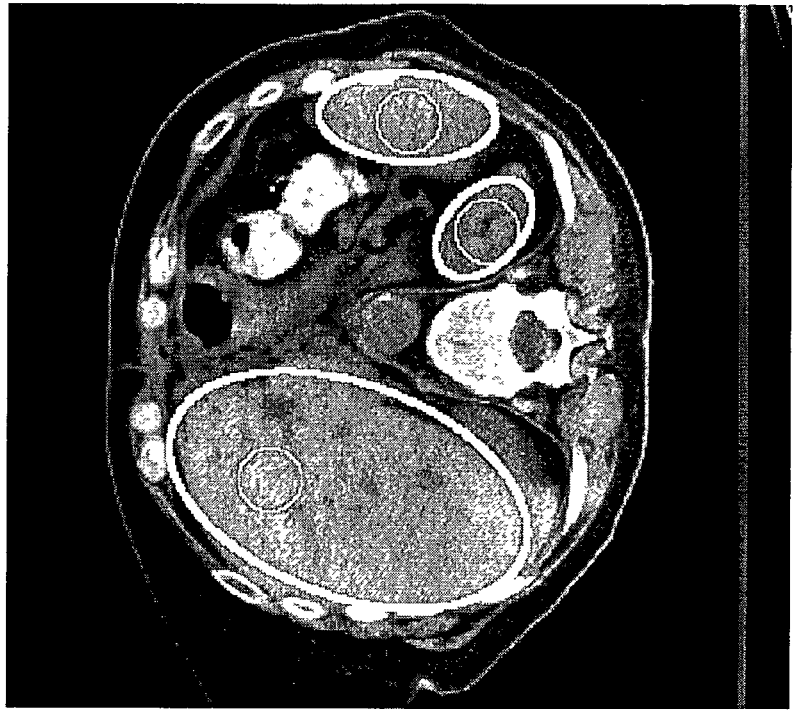
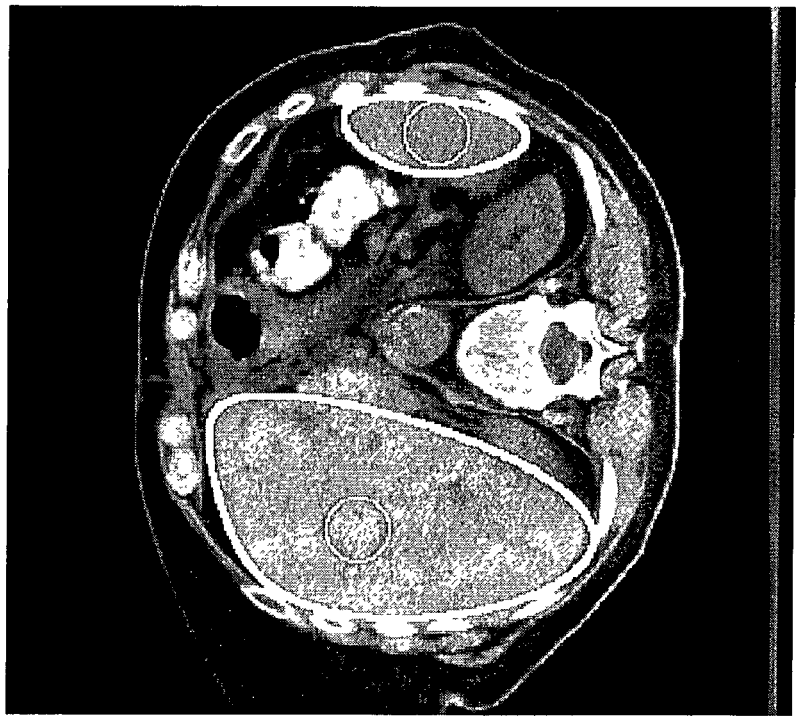
Figure 10
The heavy lines indicate the contours produced by maximizing the JRD. The light circular figures are the initial sample of the image pixels used to begin the contouring process. B. Demonstration of JRD contouring three objects simultaneously.

METHOD AND APPARATUS FOR IMAGE SEGMENTATION USING JENSEN-SHANNON DIVERGENCE AND JENSEN-RENYI DIVERGENCE

FIELD OF THE INVENTION

The present invention relates to image segmentation. More specifically, the present invention addresses an improved technique for identifying the boundaries of distinct, discrete objects depicted in digital images, particularly medical images.

BACKGROUND OF THE INVENTION

Image segmentation (also known as "autosegmentation", "contouring", and "autocontouring") is a technique of processing a digital image to detect, classify, and enumerate discrete objects depicted therein. Image segmentation presents a difficult problem because digital images generally lack sufficient information to constrain the possible solutions of the segmentation problem to a small set of solutions that includes the correct solution.

Image segmentation finds a popular application in the field of medical images, particularly computed tomography (CT) images, x-ray images, magnetic resonance (MR) images, and the like. It is highly desirable to accurately contour various anatomic objects (such as the prostate, kidneys, the liver, the pancreas, etc.) that are shown in such medical images. By accurately determining the boundary of such anatomic objects, the location of the anatomic object relative to its surroundings can be used to plan and execute medical procedures such as radiotherapy treatment for cancer. Because it is often the case that the healthy tissues and organs surrounding cancerous tissue are highly sensitive to radiation, it is extremely important that the exact location of the anatomic object to be treated be known. That is, accurate placement, shaping, and intensity modulation of external X-ray beams for tumor irradiation (teletherapy) depends absolutely on detailed 3-D maps of the patient's anatomy, as do other forms of radiotherapy treatment such as brachytherapy and radioimmunotherapy.

Treatment planning for medical procedures such as teletherapy and brachytherapy begins by creating a detailed 3-D map of the patient's anatomy (including tumors). These maps are often created as a series of contours drawn on CT slices. In teletherapy procedures, once the map is obtained, a set of external X-ray beam angles, beam cross-section shapes, and beam intensities can be designed to deliver a prescribed dose of radiation to the tumor while minimizing the harm done to nearby healthy tissues. For brachytherapy procedures, once the map is obtained, the appropriate location(s) to deliver radioactive seeds can be determined, also while minimizing the harm done to nearby healthy tissues.

Image segmentation operates on medical images in their digital form. A digital image of a target such as the human body is a data set comprising an array of data elements, each data element having a numerical data value corresponding to a property of the target, wherein the property is measured by an image sensor at regular intervals throughout the image sensor's field of view. The property to which the data values correspond may be the light intensity of black and white photography, the separate RGB components of a color image, or other similar properties. Typically the image data set is an array of pixels, wherein each pixel has a value corresponding to intensity. The leftmost image shown in FIG. 1 is a CT digital image of an interior portion of a patient's body. As can be seen, depicted in the image is the left kidney along with nearby anatomical objects such the spleen, the vertebral body, the spinal cord, and the ribs. The usefulness of digital images derives partly from the capacity of digital images to be transformed and enhanced by computer programs so that meaning can be extracted therefrom.

The data value of each data element can be modeled as a random variable. A random variable is a measured quantity whose repeated observations cluster about some central value. The "mean" is the most likely value and the "mode" is the most-often observed value. Random variables are most completely described by a histogram, resealed as a probability distribution. Typically, the data values of the data elements of the image data set constitute a random variable X which may take its values from a finite set of possible data values, such as the interval −1024 to 3071, typical for CT. In mathematical notation, the data value of any given data element of the image data set may be equal to any $x_i$, wherein $x_i$ is a member of the set $\{x_1, x_2, \ldots x_n\}$, and wherein "n" is 4096 for the CT example above. Random variables whose values are limited to members of finite sets are termed discrete; random variables which can take any real value are continuous random variables. The probability that a particular data element takes the value $x_i$ for random variable X, is expressed as $p(x_i)=Pr\{X=x_i\}$. $Pr\{\ \}$ is the probability that the expression in the braces $\{\ \}$ is true. The full set of probabilities, written p(X), is the probability distribution. As is well-known, probabilities and their distribution have the following properties:

$p(x_i) \geq 0$;

$0 \leq p(x_i) \leq 1$; and $\sum^n_{i=1} p(x_i) = 1$

To deal with 2 or more random variables at once, the concepts of joint probability and conditional probability are used. For two discrete random variables (X and Y), the joint distribution is the set of joint probabilities $p(x,y)=Pr\{x=x, Y=y\}$ for all possible values of x and y. A histogram corresponding to such a joint distribution can be represented by a two-dimensional plot with the x entries along the rows and the y entries along the columns.

The conditional probability of observing any X given that Y=y is written as p(X|Y=y), which corresponds to the column of histogram entries for Y=y. The conditional and joint probabilities are related by the definition:

$$p(X|Y) = \frac{p(X, Y)}{p(Y)} \qquad (1)$$

The conditional probability of Y, given X, is defined as:

$$p(X|Y) = \frac{p(X, Y)}{p(X)} \qquad (2)$$

Referring to FIG. 2, it can be seen that the relative sizes of the peaks shown in the histogram correspond to the probabilities that a pixel selected randomly will belong to one of the regions in the image. In the CT image shown in FIG. 2, two regions are easily discernible; interior region 100, which corresponds to the anatomical portion of the image, and exterior region 102, which corresponds to the non-anatomical portions of the image (the black background and the CT scanner couch and gantry ring depicted at the bottom of the image). The conditional probability (or likelihood) that a pixel with value $x_i$ is in a particular region k, is $p(x_i|region_k)$.

If the individual intensity probabilities in a region k are summed:

$$\sum_{i=1}^{n} p(x_i | region_k) = p(region_k) \quad (3)$$

wherein $p(region_k)$ is the probability of hitting region k when a pixel is randomly selected from the image. If there are R regions in the image, the sum of probabilities over all regions is $$\sum_{k=1}^{R} p(region_k) = 1 \quad (4)$$

because the regions cover the entire image area. Thus, the total probability over all regions and all pixel values is:

$$\sum_{k=1}^{R} \sum_{i=1}^{n} p(x_i | region_k) = 1 \quad (5)$$

These conditional probability expressions can be used to make decisions as to which pixels belong to which regions. For example, if two regions, region, and $region_2$, are equally probable, then a pixel with value $x_i$ most likely belongs to the region corresponding to the largest conditional probability $p(x_i|region_k)$, wherein k is 1 or 2 Referring back to FIG. 2, it can be seen that more pixels with high intensity are found in the interior region than in the exterior region. Similarly, more pixels with a low intensity are found in the exterior region that the interior region. Therefore, if a pixel with value −1024 (the minimum pixel value) is observed, a reasonable decision can be made that such a pixel belongs in the exterior region rather than the interior region. Various decision-making techniques for processing digital images to perform image segmentation have been developed from this basic concept.

For example, one known method of assigning pixels to a particular region is known as the "likelihood ratio test" (LRT). The LRT is defined as:

If $$\frac{p(x_i | region_1)}{p(x_i | region_2)} > T,$$

then decide $region_1$, else decide $region_2$ wherein T is a threshold value determined from training data in which the regions corresponding to each pixel value are known exactly.

The conditional probability of $region_k$ being the true region given that a pixel has a pixel value $X=x_i$ is proportional to the product of the conditional likelihood and the prior (region) probability. This conditional probability is called the a posteriori or posterior probability, and the maximum a posteriori (MAP) decision rule is derived therefrom as:

Referring back to FIG. 1, it can be seen that the different anatomic objects (kidney, spleen, ribs, spinal cord, and vertebral body) exhibit varying degrees of differences in pixel intensities. While the kidney, spleen, and spinal cord share similar pixel intensities, the pixel intensity for the ribs and vertebral body are markedly different therefrom. Further, the pixels within each object have more or less constant pixel intensities (regional coherence). Moreover, it can be seen that there are often large steps in intensity as one passes out of one object and into a neighbor (edge step differences). For example, note the dark region between the kidney and spleen. In fact, regional coherence and edge-steps are the two dominant structural features in images.

Five basic image segmentation techniques are known in the art: (1) region-based methods, (2) edge-based methods, (3) image feature clustering methods, (4) global optimization methods, and (5) hybrid methods combining region- and edge-based ideas. See Haralick R M and Shapiro L G, "Image segmentation techniques," *Computer Vision Graphics and Image Processing,* 29:100–132, 1985; Pal, N. R. and Pal, S. K., "A review on image segmentation techniques," *Pattern Recognition,* 26:1277–1294, 1993; and Tang, M. and Ma, S., "General scheme of region competition based on scale space," *IEEE Transactions on Pattern Analysis and Machine Intelligence,* 23(12), 1366–1378, 2001, the entire disclosures of which are hereby incorporated by reference.

Region-based approaches assume that region pixels have almost-constant properties, and that these properties are different from region to region. Pixel properties (also called features) include pixel intensity, and mean, variance, range, moments, etc. computed over a neighborhood of surrounding pixels.

Region-based segmentation assumes that the means and variances of these properties are constant within a region, and differ among regions. See Rosenfeld, A. and Kak, A. C., *Digital Picture Processing,* Academic Press, 1982; Beveridge, J R, Griffith, J, Kohler, R R, Hanson, A R, and Riseman, E M, "Segmenting images using localized histograms and region merging," *International Journal of Computer Vision,* 2, 311–347, 1989; and Adams, R. and Bischof, L., "Seeded region growing," *IEEE Trans. Pattern Analysis and Machine Intelligence,* 16(6), 641–647, 1994, the entire disclosures of which are hereby incorporated by reference. Because of this assumption, region-based approaches falter if the pixel properties vary across the region, or if the boundaries between regions with the same properties are blurred (by patient breathing motion in CT, for example), or if neighboring regions' properties are similar or have overlapping distributions. The success of a region-based segmentation operation is highly dependent upon the proper choice of a pixel homogeneity criterion. If the pixel homogeneity criterion is poorly chosen, the image segmentation operation results in ragged boundaries and holes in the segmented region. Moreover, even with a good choice of a pixel homogeneity criterion, the overlap of pixel distributions from adjoining regions constitutes a big problem for this approach.

Edge-based methods assume that all regions are surrounded by a significant step in the pixel property. Using this assumption, edge-based image segmentation extracts a segment by semantic analysis of the edges (see Ballard, D H and $$\text{If } \frac{p(region_1 | x_i)}{p(region_2 | x_i)} = \frac{p(x_i | region_1) p(region_1)}{p(x_i | region_2) p(region_2)} > 1, \text{ decide } region_1, \text{ else } region_2 \quad (7)$$

Brown, C M, *Computer Vision,* Prentice-Hall, Englewood Cliffs, N.J., 1982, the entire disclosure of which is hereby incorporated by reference) or by fitting a flexible curve or active contour to the actual boundary in the image (see Kass, M., Witkin, A., Terzopoulos, D., "Snakes: Active contour models," *International Journal of Computer Vision,* 1, 321–331, 1988. ; Cohen, L. D., On active contour models and balloons," *CVGIP: Image Understanding,* 53(2), 211–218, 1991; and Malladi, R., Sethia, J. A., and Vemuri, B. C., "Shape modeling with front propagation: A level set approach," *IEEE Trans. Pattern Analysis and Machine Intelligence,* 17(2), 158–175, 1995, the entire disclosures of which are hereby incorporated by reference). Like the region approach, active contour segmentation may fail if the actual pixel data does not exhibit sharp steps everywhere around the object. Successful segmentation also depends on the kind of flexible model used to match the boundary. Flexible models such as snakes and balloons show troublesome sensitivity to initial placement in the image, and the image segmentation goes awry if that placement is not sufficiently close to the true boundary. Semantic methods can assemble contour fragments discovered in the map of edges by a set of rules to produce the object form, but this is a very complex task, and except for some highly regular applications, has not found wide use in medical image analysis.

Image-feature clustering segmentation identifies objects by looking in the space of image pixel properties for clusters that correspond to the feature combinations of object pixels. Each combination corresponds to a point in feature space, where the space dimension is equal to the number of features. Sets of object pixels with similar properties correspond to sets of points clustered in feature space. Finding such point clusters enables the analyst to go back to the image and identify the pixels inhabiting this concentration, and by implication, the object. Well-established methods exist for identifying point density maxima and classifying the feature space points/image pixels. See Devroye L, Gyorfi L, and Lugosi G, *A Probabilistic Theory of Pattern Recognition,* Springer, N.Y., Springer, 1996; and Duda R O, Hart P E, and Stork D G, *Pattern Classification,* 2$^{nd}$ Ed., New York: Wiley-Interscience, 2001, the entire disclosures of which are hereby incorporated by reference. For example, the nearest neighbor rule specifies that each pixel be assigned to the region corresponding to the feature space cluster nearest that pixel's feature space location. Many other clustering rules exist and are used in, for example, commercial data mining applications. See Witten, I. H. and Frank, E., *Data Mining,* Morgan Kaufmann, San Francisco, Calif., 1999 (the entire disclosure of which is hereby incorporated by reference); and Duda et al. (2001). The problems which can confound density rules for image clustering are the same problems described above in connection with region-based techniques; property densities overlap making classification error inevitable. Estimating cluster point densities requires that feature space be "binned", which means that a smoothed version of the space must be computed so that areas of low frequency are given some reasonable probability. If the number of features is large, the data is spread out over more dimensions, making the pixel classification more computationally expensive, and exacerbating the data sparsity.

Global optimization segmentation performs non-linear transformations on the image pixel values to maximize an objective function which is assumed to accurately describe the properties of the image, or the properties of the measurement process that formed the image. The two most famous ideas are iterated conditional modes (See Besag, J., "On the statistical analysis of dirty pictures," *Journal of the Royal Statistical Society,* 48, 259–279, 1986, the entire disclosure of which is hereby incorporated by reference) and Markov-Gibbs refinement (See Geman, S. and Geman, D., "Stochastic relaxation, Gibbs distribution and the Bayesian restoration of images". *IEEE Transactions on Pattern Analysis and Machine Intelligence,* 6(6): 721–741, 1984, the entire disclosure of which is hereby incorporated by reference). In both cases, the image is transformed by small, iterative steps to versions in which the regions have constant features different from the surrounding regions. While built on powerful ideas, these methods assume simple behaviors for the pixel properties, and these assumed behaviors do not seem to correspond well to those of real images. One problem, already mentioned, is that the pixel properties are not stationary-that is, their means and variances change across a region. Non-stationarity is a complex problem not well modeled by any current theories. A second problem is that the pixel properties do not always exhibit normal distributions (Gaussian) or other distributions that such theories often employ. As such, these methods are less well-equipped to operate on images with arbitrary property distributions.

Hybrid segmentation methods operate on several image properties at once. A good example of these methods are those developed by Duncan and Staib. See Staib L H and Duncan J S, "Boundary finding with parametrically deformable models," *IEEE Transactions on Pattern Analysis and Machine Intelligence,* 14, 1061–1075, 1992, the entire disclosure of which is hereby incorporated by reference. Briefly, Staib and Duncan proposed applying rigorously correct statistical inference to automated image segmentation by matching the properties of a flexible-shape template to image objects. Later, Chakraborty added to the Duncan/Staib method by integrating the flexible contour model with region, edge, and prior shape information to find a region boundary. See Chakraborty A, Staib L H, Duncan J S, "Deformable boundary finding in medical images by integrating gradient and region information," *IEEE Transactions on Medical Imaging,* 15, 859–870, 1996, the entire disclosure of which is hereby incorporated by reference. So, in addition to the region and edge properties of the current image, one could add a bias in favor of the shapes of the same organ determined previously on neighboring CT sections. The inference methods used are either the likelihood ratio decision rule or the maximum a posteriori decision rule (when prior boundary shapes are known). These decision rules guarantee minimum average errors given the data.

Because the correct boundary is not computable directly, the above-described Duncan/Staib/Chakraborty (DSC) method iteratively computes the value of the decision rule and adjusts the flexible curve so as to maximize the value of the decision-rule function. The flexible curve is a finite trigonometric series whose coefficients, or parameters, fully define the location, size, and shape of the curve. The actual "footprint" of the curve on the image can be quickly computed, and compared to an independently-segmented region boundary, to object edges in a map of all the image object edges, and to the shape of a similar object determined previously. The extent of these agreements is input to a decision rule function. If the value of the decision rule function is higher (more probable) than any previous value, this curve is saved, and the program searches for another curve that gives even higher values to the decision rule function. After satisfying a stopping criterion, the program reports the curve corresponding to the largest value of the decision rule function.

In addition to the five segmentation approaches described above, there have been a small number of information theoretic image applications. Information theory since its start has been applied to problems of data compression, coding, and model estimation. Kullback and Leibler discovered information theoretic equivalents to the minimum-error maximum likelihood and Bayesian decision rules. These rules use the data distributions directly, giving results that are independent of the origin of the data or any model of the data.

Image segmentation techniques previously developed by the inventor herein are disclosed in U.S. Pat. Nos. 5,859,951 and 6,249,594. The '951 patent describes a region-based approach using Bayesian classification of pixels operating on pixel intensity and variance features. The '594 patent describes a unique combination of Bayesian region classification with the DSC approach to create a useable tool. The initial contour used by the programs described in the '951 and '594 patents are either generated manually by the operator or taken from the contour of a related image. The '951 technique operated on single image regions, and was capable of generating a refined contour faster than the operator could draw it. The '594 technique includes the functionality of the first program, and steps from CT section to CT section, automatically computing refined contours using previous-section contours as starting estimates.

While the above-described segmentation techniques have contributed to the art, a need still exists for a segmentation technique that is more accurate and less sensitive to the effects of modeling errors or the like.

SUMMARY OF THE INVENTION

Toward this end, the inventor herein has developed an image segmentation technique using new decisional rules that do not require any model for the image data. Further, the image segmentation technique of the present invention is more capable than the prior art in segmenting objects having non-stationary data characteristics. Further still, the present invention treats both region data and edge data in a natural way. The approach of the present invention is based on statistical pattern recognition, information theory, and numerical optimization of objective functions that capture the probabilistic dependencies among the different types of information contained in digital images.

The inventor herein has found that using either the Jensen-Shannon divergence (JSD) or the Jensen-Renyi divergence (JRD) as the criterion for optimizing the accuracy of a boundary estimate greatly improves the accuracy of image segmentation.

Accordingly, disclosed herein is a method of identifying the boundary of an object in an image, the image being represented by a data set, the data set comprising a plurality of data elements, each data element having a data value corresponding to a feature of at least a part of the image, the method comprising adjusting a boundary estimate at least partially according to one of the group consisting of a Jensen-Shannon divergence value corresponding to the boundary estimate and a Jensen-Renyi divergence value corresponding to the boundary estimate such that the boundary estimate substantially matches the object boundary. The divergence value represents a measure of the difference between the data values of the data elements located in a zone $Z_I$ and the data values of the data elements located in a zone $Z_O$, $Z_I$ and $Z_O$ being defined by the boundary estimate and representing, respectively, the data elements of the image located inside and outside the boundary estimate.

Preferably, each data value $x_i$ of the random variable X is any member of the data value set $X'=\{x_1, x_2, \ldots x_n\}$, $X'$ comprising a plurality of possible data values, and wherein each data value is the value of a random variable X drawn from the data value set $X'$ according to the probability law $p(x_i)=Pr\{X=x_i\}$, and wherein the probability laws in the several image zones may be different such that the probability of observing X with the specific value $x_i$ in the zone $Z_O$ is the conditional probability $p(x_i|Z_O)$ and the probability of observing X with the specific value $x_i$ in the zone $Z_I$ is the conditional probability $p(x_i|Z_I)$, and wherein the divergence value represents a measure of the difference between a conditional probability distribution $p(X|Z_I)$ and a conditional probability distribution $p(X|Z_O)$. Also, the boundary estimate is preferably a contour C, and more preferably a parametric contour C comprising a plurality N of ordered contour coefficients $c_1$ through $C_N$, each contour coefficient $c_i$ having a numeric value.

Moreover, the method may further comprise the steps of: (1) determining a contour that represents an approximation of the object boundary; (2) calculating one of the group consisting of the Jensen-Shannon divergence value and the Jensen-Renyi divergence for the contour; and (3) wherein the adjusting step comprises adjusting the approximate contour so as to increase its calculated divergence value.

The divergence value calculating step may comprise the steps of: (1) identifying which data elements are located in $Z_I$; (2) identifying which data elements are located $Z_O$; (3) calculating the conditional probability distribution $p(X|Z_I)$; (4) calculating the conditional probability distribution $p(X|Z_O)$; and (5) calculating the divergence value between $p(X|Z_I)$ and $p(X|Z_O)$.

Also, the adjusting step preferably further comprises adjusting the approximate contour so as to substantially maximize its calculated divergence value. Preferably this adjustment process adjusts the most significant coefficients prior to adjusting less significant coefficients by individually adjusting the coefficient values of at least a plurality of approximate contour coefficients starting from $c_1$ and continuing through successively higher order approximate contour coefficients until the approximate contour's divergence value is substantially maximized.

The image is preferably a medical image of an interior portion of a body, wherein the data set comprises a plurality of pixels, each pixel having a pixel value corresponding to image intensity.

Furthermore, the image may comprise a plurality of objects, each object having a boundary, the method further comprising performing the adjusting step simultaneously for at least two of the image objects.

Further still, each data element may have a plurality of data values corresponding to different features of the image, and the segmentation process may use each of these data values when fitting the contour to the object boundary.

These and other features and advantages of the present invention will be in part apparent and in part pointed out in the following description and referenced figures.

BRIEF DESCRIPTION OF THE DRAWINGS

FIG. 2 is an exemplary CT digital image accompanied by histograms of pixel intensities corresponding to the areas of the image inside and outside the patient;

FIGS. 3(a) and 3(b) are overviews of the apparatus for carrying out the present invention;

FIG. 3(c) depicts a multiprocessor computer that can perform the processing for the present invention;

FIG. 10 depicts an example of JSD/JRD image segmentation performed on multiple objects simultaneously within a CT image.

DETAILED DESCRIPTION OF THE PREFERRED EMBODIMENT

FIG. 3(a) illustrates an overview of the system configured to carry out the image segmentation technique of the present invention. An image sensor 148 is used to generate the image data set that is processed by processor 150. Processor 150 performs the image segmentation. The image data set may be passed directly from the sensor 148 to processor 150 (as shown in FIG. 3(a)) or passed via an image database 152 (as shown in FIG. 3(b)). The image sensor is preferably a CT scanner. However, any image sensor capable of producing a digital image, such as an MR scanner, X-ray scanner, or the like may be used in the practice of the present invention.

To speed processing, processor 150 can be a multiprocessor computer. As will become more apparent below, many of the computations made in the preferred implementation of the invention can be performed independently. As such, these independent computations can be made on separate hardware processors in parallel to speed the operation of the invention. Processor 150 is preferably a general purpose computer, such as a high performance UNIX workstation, executing software programmed to carry out the image segmentation technique of the present invention.

Figure 4:
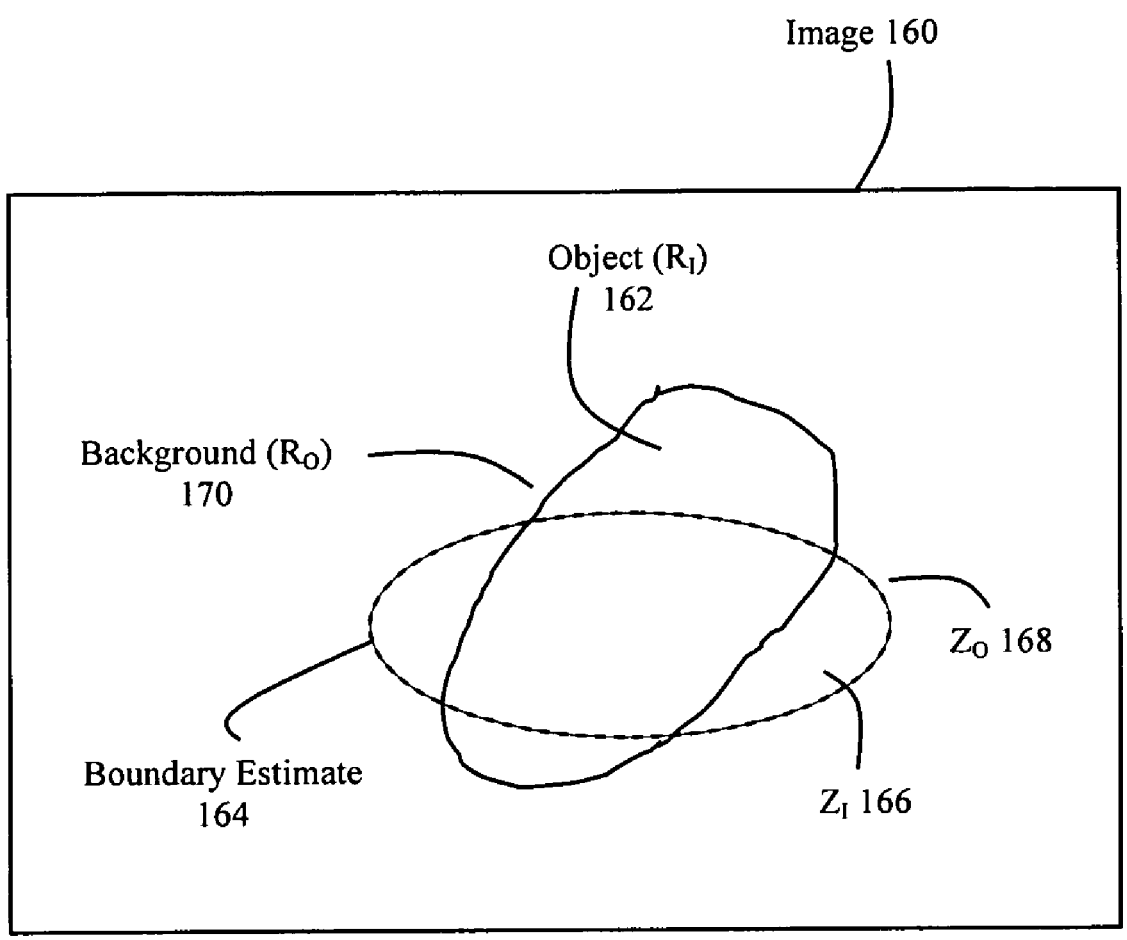
FIG. 4 is an illustration of the image segmentation problem.

FIG. 4 illustrates the basic problem presented by image segmentation. FIG. 4 shows an image 160 that includes an object 162 and a background 170 (background 170 encompasses the area of the image 160 outside the object 162). The image 160 is comprised of rows and columns of pixels that cover the image area. In image segmentation, the goal is to accurately identify object 162 from background 170. To do this, a boundary estimate (segmentation estimate) 164 is determined. The placement of boundary estimate 164 defines a zone $Z_I$ of pixels located inside the boundary estimate 164 and a zone $Z_O$ of pixels located outside the boundary estimate 164. During image segmentation, the boundary estimate 164 is refined such that it substantially matches the true boundary of the object 162. When the refined boundary estimate 164 substantially matches the object's true boundary, $Z_I$ will correspond to the pixels making up the object 162 and $Z_O$ will correspond to the pixels making up the background 170.

1. Flexible Parametric Contours

The boundary estimate 164 is preferably a flexible contour curve C. Contour C has a length T and is a function of arc length t (wherein $0 \leq t \leq T$). Contour C is defined by a vector of ordered real coefficients $c_1$ through $C_N$.

$$C(t)=f(c,t); c=(c_1, c_2 \ldots c_N); C \epsilon R^N \quad (8)$$

The contour coefficients $c_i$ fully define the location, size, and shape of the contour C in the image space. The contour coefficients serve as the independent variables whose numerical values are adjusted during the image segmentation process to fit the contour to the object boundary.

Preferably, N=4K+2, and the coefficients $c_i$ are the coefficients of a finite trigonometric series truncated at K harmonics, known as a Fourier elliptic representation. See Giardina C R and Kuhl F P, "Accuracy of curve approximation by harmonically related vectors with the elliptical loci," *Computer Graphics and Image Processing*, 21, 277–285, 1977; and Kuhl F P and Giardina C R, "Elliptic Fourier features of a closed contour," *Computer Graphics and Image Processing*, 18, 236–258, 1982, the entire disclosures of which are incorporated herein by reference; and see also Duncan and Staib (1992). This Fourier elliptic representation:

$$C(t) = \begin{bmatrix} x(t, k) \\ y(t, k) \end{bmatrix}_{k=1,K} \quad (9)$$

is defined by the curve coordinate formulas 10 and 11 for the coefficients as:

$$x(t) = A_0 + \sum_{k=1}^{K} a_k \cos\left(\frac{2\pi k t}{T}\right) + b_k \sin\left(\frac{2\pi k t}{T}\right) \quad (10)$$

$$y(t) = B_0 + \sum_{k=1}^{K} c_k \cos\left(\frac{2\pi k t}{T}\right) + d_k \sin\left(\frac{2\pi k t}{T}\right) \quad (11)$$

wherein:

$$c=(c_1, c_2, \ldots, c_{4K+2})=(A_0, B_0, a_1, b_1, c_1, d_1, a_2, b_2, c_2, d_2, \ldots, a_K, b_K, c_K, d_K) \quad (12)$$

where parameter $t \epsilon [0, T)$ for the closed contour C of length T.

The number of harmonics K determines the accuracy with which C is capable of matching an object boundary. A trade-off exists when determining the number K. If the number of harmonics K is too small, the resolution of C may not be sufficient to accurately match the object boundary. A large value for K produces better boundary matches, but requires a proportionally longer time to compute. Further, if a very large value for K is used, the resulting contour C exhibits noise that appears as wiggles. The wiggles cause inaccuracy in the matching process. Preferably, to resolve this tradeoff, the rule disclosed in Hibbard, L., "Maximum a posteriori Segmentation for Medical Visualization", IEEE Workshop on Biomedical Image Analysis (WBIA98), Santa Barbara, Calif., Jun. 26–27, 1998, pp. 93–102 (the entire disclosure of which is hereby incorporated by reference), is followed.

The transformation of C from x,y coordinates to parameters $c_i$ (and vice versa) is straightforward and known in the art. See Kuhl and Giardina (1982). Because the computation of coordinates from coefficients (and from coefficients to coordinates) is fast, a computer program can explore a large space of different contours by systematically varying the values of the individual coefficients $c_i$. The question then becomes how a decision-making process can be designed to determine how the coefficients should be adjusted to result in a matching contour C and how such a process will recognize when a substantial match has occurred.

2. Jensen-Shannon and Jensen-Renyi Divergences

Consider the possible values for pixel intensity to be a discrete random variable X which may take a specific value X=x from a set of n possible values $x \in \{x_1, x_2, \ldots, x_n\}$. The probability distribution for X is $p(x_i)=\Pr\{X=x_i\}$ where $p(x_i) \geq 0$ and the sum of all $p(x_i)$ for all n values of X is 1. The Shannon entropy $H_S(p)$ for the distribution p is defined as:

$$H_S(p) = -\sum_{i=1}^{n} p(x_i) \log p(x_i) \quad (13)$$

where $H_S(p) \geq 0$. See Shannon C E, "A mathematical theory of communication," *The Bell System Technical Journal*, Vol. 27, pp. 379–423, October 1948; and Cover T M and Thomas J A, *Elements of Information Theory*. New York: Wiley-Interscience, 1991, the entire disclosures of which are incorporated herein by reference. The Shannon entropy for a distribution is a measure of the degree of randomness of the distribution. $H_S(p)=0$ exactly if all the probability is associated with one outcome, such as X always equals $x_i$ such that $p(x_i)=1$, with all the other elements of the distribution $p(x_k)=0$, $k \neq i$. $H_S(p)$ is a maximum when all the $x_i$ are equally probable, or $p(x_i)=1/n$ for all i.

For the discrete random variable X, there may exist two (or more) distributions associated with X in different states of nature. The relative entropy D is a measure of the differences between two distributions of X, p(X) and q(X), and is defined as:

$$D(p\|q) = \sum_{i=1}^{n} p(x_i) \log \frac{p(x_i)}{q(x_i)} \quad (14)$$

where, by convention $0\log(0/q)=0$ and $p\log(p/0)=\infty$. See Kullback S and Leibler R A, "On information and sufficiency," *Annals of Mathematical Statistics*, 22, 79–86, 1951; and Kullback S, *Information Theory and Statistics*, New York: Wiley, 1959, the entire disclosures of which are incorporated herein by reference; and Cover and Thomas (1991). The relative entropy is also known as the Kullback-Leibler divergence, the I-divergence, the cross entropy, etc. Relative entropy is always non-negative, is exactly zero when $p(x_i)=q(x_i)$ for all i, and increases in value as the distributions are more different. Further, relative entropy is not symmetric since $D(p\|q) \neq D(q\|p)$ in general.

The present invention is concerned with deciding whether a series of samples $\{X_1, X_2, \ldots, X_Q\}$ drawn independently and identically from an unknown distribution corresponds to one or the other of two states of nature (anatomic regions) $H_1$ and $H_2$ which could have produced them. It is usual in statistics to cast the problem in terms of hypotheses:

$H_1$:$\{X_1, \ldots, X_Q\}$ drawn from $p(X|H_1)$ $H_2$:$\{X_1, \ldots, X_Q\}$ drawn from $p(X|H_2)$ \quad (15)

where $p(X|H_i)$ is the probability of observing x given that it corresponds to the state of nature $H_i$. These are the class-conditional distributions, or data likelihoods, and if they can be estimated from labeled training data or other information, one can use the LRT to decide between $H_1$ and $H_2$. See Van Trees H L, *Detection, Estimation, and Modulation Theory, Part I*, Wiley, New York, 1969; Duda R O and Hart P E, *Pattern Classification and Scene Analysis*, Wiley, New York, 1973; and Fukunaga K, *Introduction to Statistical Pattern Recognition*, Academic Press, New York, 1990, the entire disclosures of which are incorporated herein by reference; and Devroye (1996); and Duda (2001).

The ratio of the likelihoods can be rewritten as the log-quantity:

$$L(X_1, \ldots, X_Q) = \log \frac{p(X_1, \ldots, X_Q | H_1)}{p(X_1, \ldots, X_Q | H_2)}. \quad (16)$$

Since the samples are independent, their joint conditional probability is equal to the product of the individual conditional probabilities, $$p(X_1, \ldots, X_Q | H_i) = \prod_{q=1}^{Q} p(X_q | H_i) \quad (17)$$

and the log of the joint probability is:

$$\log p(X_1, \ldots, X_Q | H_i) = \prod_{q=1}^{Q} \log p(X_q | H_i). \quad (18)$$

Therefore, the log-product of probability-ratios in (16) can be written directly as the sum of log-ratio terms:

$$L(X_1, \ldots, X_Q) = \sum_{q=1}^{Q} \log \frac{p(X_q | H_1)}{p(X_q | H_2)}. \quad (19)$$

Changing from summation over the samples to summation over the set of values each sample may take:

$$L(X_1, \ldots, X_Q) = \sum_{i=1}^{n} Q p_X(x_i) \log \frac{p(x_i | H_1)}{p(x_i | H_2)} \quad (20)$$

where $p_x(x_i)$ is the distribution of the $x_i$ in the sequence of samples $X_1, X_2, \ldots, X_Q$, and where $Q p_x(x_i)$ weights the log-ratio by the number of times that $x_1$ occurs in the sequence $X_1$ through $X_Q$. Now, multiplying each term by a factor of one, $p_x(x_i)/p_x(x_i)$, one can obtain the difference of sums:

$$L(X_1, \ldots, X_Q) = \sum_{i=1}^{n} n p_X(x_i) \log \frac{p(x_i | H_1)}{p(x_i | H_2)} \cdot \frac{p_X(x_i)}{p_X(x_i)} \quad (21)$$

-continued $$= \sum_{i=1}^{n} np_X(x_i) \log \frac{p_X(x_i)}{p(x_i|H_2)} - \sum_{i=1}^{n} np_X(x_i) \log \frac{p_X(x_i)}{p(x_i|H_1)}$$

which can be written as the difference of relative entropies:

$$L(X_1, \ldots, X_Q) = n[D(p_x(x)\|p(x|H_2)) - D(p_x(x)\|p(x|H_1))]. \tag{22}$$

Therefore, the relative entropy-equivalent to the LRT is:

If $D(p_X(x)\|p(x|H_2)) - D(p_X(x)\|p(x|H_1)) > \frac{1}{n}\log T$, (23)

decide $H_1$, eles $H_2$.

Formula 23 is a minimum-error classifier capable of assigning a sample distribution of a random variable to one of two known distributions, without reference to any model for the distributions.

Renyi introduced a generalization of the Shannon entropy. See Renyi A, "On measures of entropy and information," *Proceedings of the Fourth Berkeley Symposium on Mathematical Statistics and Probability*, Berkeley, Calif., Jun. 20–Jul. 30, 1960, Volume I, published 1961, pp. 547–561; Renyi A, "Some Fundamental Questions of Information Theory". *Selected Papers of Alfred Renyi*, Volume 2, pp 526–552, Akademia Kiado, Budapest, 1976; and Renyi A, "On Measures of Entropy and Information". *Selected Papers of Alfred Renyi*, Vol. 2. pp 565–580, Akademia Kiado, Budapest, 1976, the entire disclosures of which are hereby incorporated by reference. The Renyi entropy of degree $\alpha$, $H_{R\alpha}(p)$, is defined as $$H_{R\alpha}(p) = \frac{1}{1-\alpha} \log \sum_{i=1}^{n} p(x_i)^{\alpha} \quad \alpha > 0, \alpha \neq 1. \tag{24}$$

That is, the Renyi entropy tends to the Shannon entropy as $\alpha \to 1$. The Shannon and Renyi entropies are related as:

$$H_{R\alpha} \geq H_S \geq H_{R\beta}, \ 0 < \alpha < 1, \beta > 1. \tag{25}$$

See Principe J C, Xu D, and Fisher J W III, "Information-theoretic learning," in *Unsupervised Adaptive Filtering*, S. Haykin, Ed. New York: Wiley, 1999, 265–319, the entire disclosure of which is incorporated herein by reference.

Jensen-Shannon divergence (JSD) and Jensen-Renyi divergence (JRD) are two relative entropy measures. For the case of two hypotheses $H_1$ and $H_2$, the JSD is defined as:

$$JS_\pi = H_S(\pi_1 p(x|H_1) + \pi_2 p(x|H_2)) - \pi_1 H_S(p(x|H_1)) - \pi_2 H_S(p(x|H_2)) \tag{26}$$

See Lin J, "Divergence measures based on the Shannon entropy," *IEEE Transactions on Information Theory*, 37, 145–151, 1991, the entire disclosure of which is incorporated herein by reference. $JS_\pi$ is a measure of the difference between two distributions $p(x|H_1)$ and $p(x|H_2)$, where the variables $\pi_1$ and $\pi_2$ are weights for the probability distributions. Preferably, $\pi_1$ represents the a priori probability that $H_1$ is true, and $\pi_2$ represents the a priori probability that $H_2$ is true. In image segmentation, $\pi_1$ could represent the prior probability that any pixel belongs to the region associated with $H_1$, and $\pi_2$ could represent the prior probability that any pixel belongs to the region associated with $H_2$. Unlike the relative entropy, the Jensen-Shannon divergence is symmetric. That is, $JS_\pi$ in equation (26) is unchanged if the subscripts 1 and 2 are reversed.

In addition, $JS_\pi$ can be defined for m hypotheses $$JS_\pi(p_1, \ldots, p_m) = H\left(\sum_{i=1}^{m} \pi_i p_i\right) - \sum_{i=1}^{m} \pi_i H(p_i) \tag{27}$$

where the $p_i$ through $P_m$ are the conditional distributions $p(x|H_i)$ through $p(x|H_m)$ and the $\pi_i$ are the distribution weights where $\pi_i \geq 0$ and where the sum of $\pi_i$ for each value of i is 1. The $JS_\pi$ is maximum when the distributions are all maximally different one from another.

For the case of m-distributions $p(x|H_i)$ through $p(x|H_m)$ of X, the JRD is defined as:

$$JR_\alpha^\pi(p_1, \ldots, p_m) = R_\alpha\left(\sum_{i=1}^{m} \pi_i p(x|H_i)\right) - \sum_{i=1}^{m} \pi_i R_\alpha(p(x|H_i)) \tag{28}$$

where $\pi_i$ through $\pi_m$ are the weights attached to each distribution such that $\pi_i \geq 0$ and the sum of $\pi_i$ for each value of i is 1. See He Y, Hamza A B, and Krim H, "An information divergence measure for inverse synthetic aperture radar focusing," IEEE Workshop on Signals and Signal Processing, Singapore, August 2001, the entire disclosure of which is incorporated herein by reference. The JRD is nonnegative for $0 < \alpha < 1$, symmetric to the interchange of subscripts (unlike the relative entropy), and equals zero only when all the probability $p(x|H_i)$ through $p(x|H_m)$ are equal for all $\alpha$. Finally, as $\alpha \to 1$ the JRD tends to the JSD. And like the JSD, the JRD is maximum when the distributions are all maximally different one from another.

3. Divergence and Optimal Contours

The present invention is addressed to minimum error contouring based on either the Jensen-Shannon or Jensen-Renyi divergences. Referring back to FIG. 4, when object 162 (or region $R_I$) is to be segmented from the background 170 (or region $R_O$), contour C is fit to the object boundary by finding the vector of coefficients for C which defines the closed curve that best matches the actual boundary. A family of such contours . . . , $C^{(i-1)}$, $C^{(i)}$, $C^{(i+1)}$, . . . might be generated during the course of an iterative search for the best C. The interior and exterior regions of the specific contour $C^{(i)}$ are designated $Z_I^{(i)}$ and $Z_O^{(i)}$ respectively.

First, the total distribution of pixel property X is defined as:

$$p(X) = \sum_{j=\{I,O\}} p(X|R_j)p(R_j) \tag{29}$$

where $p(X|R_j)$ is the conditional probability of observing data X given that it is associated with region $R_j$ and $p(R_j)$ is the probability of encountering region $R_j$ (the prior probability). See Grimmett G R and Stirzaker D R, *Probability and Random Processes*, $2^{nd}$ Edition, Oxford University Press, 1992, the entire disclosure of which is incorporated herein by reference. Likewise, the total distribution for the zones for an approximate contour $C^{(i)}$ can be written as:

$$p(X) = \sum_{j=\{I,O\}} p(X|Z_j)p(Z_j). \tag{30}$$

The full and complete description of the variation in the random variable X with respect to the set of zones $\{Z_I, Z_O\}$ and regions $\{R_I, R_O\}$ is expressed in the total joint probability distribution $p(X,Z,R)$ which may be written as the product of conditional probabilities.

$$p(X,Z,R) = p(X|Z,R)p(Z|R)p(R) \tag{31}$$

where $p(X|Z,R)$ is the probability of observing X given both Z and R jointly, $p(Z|R)$ is the conditional probability of being at a point in zone Z given region R, and $p(R)$ is the prior probability of being located in region R. The total distribution is formed over X alone by summing over the sets of zones and regions as:

$$p(X) = \sum_{j=\{I,O\}} \sum_{i=\{I,O\}} p(X|Z_j, R_i)p(Z_j|R_i)p(R_i). \tag{32}$$

For any contour C that is not equal to the true region boundary, the interior and exterior zones contain mixtures of both $R_I$ and $R_O$. That is, $Z_j$ overlaps $R_i$ so the conditional probability $p(Z_j|R_i)$ captures the extent of overlap of zone $Z_j$ with region $R_i$. With improvement of the C approximation, the zones will approach the regions in size, shape, and pixel distribution, or as $Z_j \to R_j$, $j=\{I,O\}$, it will be true that $p(Z_j|R_j) >> p(Z_j|R_i)$ for $i \neq j$. Since $p(R_i)$ is constant, the total distribution can be approximated by $$p(X) \approx \sum_{j=\{I,O\}} p(X|Z_j)p(Z_j|R_j)p(R_j) \tag{33}$$

As the contour C is fit to the true region boundary, the changes in the distribution $p(X)$ will be a function only of the factors dependent on Z, $p(X|Z_j)$ and $p(Z_j|R_j)$.

Next, the LRT for two separate distributions (inside $X_1, X_2, \ldots, X_Q \in p(X|Z_I)$ and outside $X'_1, X'_2, \ldots, X'_Q \in p(X|Z_O)$ simultaneously as the joint probability distribution $p(X_1, X_2, \ldots, X_Q, X'_1, X'_2, \ldots, X'_Q)$. The LRT for the combined distributions versus their opposing region-hypotheses is written:

$$L(X_1, X_2, \ldots, X_Q, X'_1, X'_2, \ldots, X'_Q) \tag{34}$$

$$= \prod_{i=1}^{Q} \frac{p(X_i|Z_I)p(Z_I|R_I)p(R_I)}{p(X_i|Z_O)p(Z_O|R_O)p(R_O)} \prod_{i=1}^{Q} \frac{p(X'_i|Z_O)p(Z_O|R_O)p(R_O)}{p(X'_i|Z_I)p(Z_I|R_I)p(R_I)}$$

$$= \prod_{i=1}^{Q} \frac{p(X_i|Z_I)}{p(X_i|Z_O)} \prod_{i=1}^{Q} \frac{p(X'_i|Z_O)}{p(X'_i|Z_I)}$$

since the probabilities not involving X or X' can be factored out to give a product equal to 1. In log form, $$\log L(X_1, X_2, \ldots, X_Q, X'_1, X'_2, \ldots, X'_Q) = \tag{35}$$

$$\sum_{i=1}^{Q} \log \frac{p(X_i|Z_I)}{p(X_i|Z_O)} + \sum_{i=1}^{Q} \log \frac{p(X'_i|Z_O)}{p(X'_i|Z_I)}.$$

which is a function only of the zones and not the regions.

By derivation, the difference between relative entropies can be obtained. Rewriting (35) with the sums over the sets of values the random variables X,X' may take:

$$\log L(X_1, X_2, \ldots, X_Q, X'_1, X'_2, \ldots, X'_Q) = \tag{36}$$

$$\sum_{k=1}^{Q} Q p_X(x_i) \log \frac{p(x_i|Z_I)}{p(x_i|Z_O)} + \sum_{i=1}^{Q} Q p_{X'}(x'_i) \log \frac{p(x'_i|Z_O)}{p(x'_i|Z_I)}$$

where the distributions $p_x(x), p_x(x')$ are those of the random variables with respect the finite set of values they may assume.

Multiplying each term by a factor of 1:

$$\log L(X_1, X_2, \ldots, X_Q, X'_1, X'_2, \ldots, X'_Q) = \tag{37}$$

$$\sum_{i=1}^{Q} Q p_X(x_i) \log \frac{p(x_i|Z_I)}{p(x_i|Z_O)} \frac{p_X(x_i)}{p_X(x_i)} + \sum_{i=1}^{Q} Q p_{X'}(x'_i) \log \frac{p(x'_i|Z_O)}{p(x'_i|Z_I)} \frac{p_X(x_i)}{p_X(x_i)}$$

and rearranging:

$$\log L(X_1, X_2, \ldots, X_Q, X'_1, X'_2, \ldots, X'_Q) \tag{38}$$

$$= \sum_{i=1}^{Q} Q p_X(x_i) \log \frac{p_X(x_i)}{p(x_i|Z_O)} - \sum_{i=1}^{Q} Q p_X(x_i) \log \frac{p_X(x_i)}{p(x_i|Z_I)} +$$

$$\sum_{i=1}^{Q} Q p_{X'}(x'_i) \log \frac{p_{X'}(x'_i)}{p(x'_i|Z_I)} - \sum_{i=1}^{Q} Q p_{X'}(x'_i) \log \frac{p_{X'}(x'_i)}{p(x'_i|Z_O)}$$

we obtain the sums and differences of relative entropy:

$$\log L(X_1, X_2, \ldots, X_Q, X'_1, X'_2, \ldots, X'_Q) = Q[D(p_x(x) \| p(x|Z_O)) - D(p_x(x) \| p(x|Z_I)) + D(p_{x'}(x) \| p(x|Z_I)) - D(p_{x'}(x) \| p(x|Z_O))] \tag{39}$$

The log-likelihood $\log L(.)$ is maximized when the distribution of X inside the contour C is most like the distribution x conditioned on being in the zone $Z_I$ and simultaneously when the distribution of X' outside the contour C is most like the distribution X' conditioned on being in the zone $Z_O$. This achieved for the simpler expression:

$$c^* = \underset{c}{\arg\max}\, D(p(X|Z_I) \| p(X'|Z_o)). \tag{40}$$

That is, the best contour C* is the one for which the distributions $p(X|Z_I)$ and $p(X'|Z_O)$ are most different by the relative entropy measure.

The corresponding maximum contour expressions for the Jensen-Shannon and the Jensen-Renyi divergences are stated by analogy to equation (40). The Jensen-Shannon divergence corresponding to the best contour for the case of two regions is $$c^* = \underset{c}{\operatorname{argmax}} JS_\pi \qquad (41)$$
$$= \underset{c}{\operatorname{argmax}} [H_S(\pi_0 p(X'|Z_O) + \pi_1 p(X|Z_I)) -$$
$$\pi_0 H_S(p(X'|Z_O)) - \pi_1 H_S(p(X|Z_I))]$$

where Hs(.) is the Shannon entropy defined in (13). For m regions, or m−1 objects plus the background, the set of best contours $C_1^*$ through $C_{m-1}^*$ are those whose collective coefficients maximize the Jensen-Shannon divergence:

$$\{c_1^*, c_2^*, \ldots c_{m-1}^*\} = \arg\underset{\{c_1, c_2, \ldots c_{m-1}\}}{\max} [JS_\pi(p_1, \ldots, p_m)] \qquad (42)$$
$$= \arg\underset{\{c_1, c_2, \ldots c_{m-1}\}}{\max} \left[ H_S\left(\sum_{i=1}^m \pi_i p(X|Z_i)\right) - \sum_{i=1}^m \pi_i H_S(p(X|Z_i)) \right]$$

where the $\pi_i$ are the weights on the probability distributions of the m regions. The contour subscripts match the index of the corresponding region.

The maximum-contour Jensen-Renyi divergence expression can be similarly written. For the case of two regions ($R_I$ and $R_O$) to be separated, the Jensen-Renyi divergence is maximized for the boundary contour with parameter vector c* which most perfectly separates the two regions:

$$c^* = \underset{c}{\operatorname{argmax}} JR_\alpha^\pi(p_1, p_2) \qquad (43)$$
$$= \underset{c}{\operatorname{argmax}} [H_{R\alpha}(\pi_0 p(X|Z_O) + \pi_1 p(X|Z_I)) -$$
$$\pi_0 H_{R\alpha}(p(X|Z_O)) - \pi_1 H_{R\alpha}(p(X|Z_I))]$$

where $H_{R\alpha}(.)$ is the Renyi entropy defined in (24). For m regions, or (m−1) objects plus the background, the set of best contours $C_1^*$ through $C_{m-1}^*$ are those whose collective coefficients maximize the Jensen-Renyi divergence:

$$\{c_1^*, c_2^*, \ldots c_{m-1}^*\} = \arg\underset{\{c_1, c_2, \ldots c_{m-1}\}}{\max} [JR_\alpha^\pi(p_1, \ldots, p_m))] \qquad (44)$$
$$= \arg\underset{\{c_1, c_2, \ldots c_{m-1}\}}{\max} \left[ H_{R\alpha}\left(\sum_{i=1}^m \pi_i p(x|Z_i)\right) - \sum_{i=1}^m \pi_i H_{R\alpha}(p(x|Z_i)) \right]$$

where the $\pi_i$ are the weights on the probability distributions of the m regions. The contour subscripts match the index of the corresponding region.

4. Autocontouring Program Based on JSD/JRD

Figure 5:
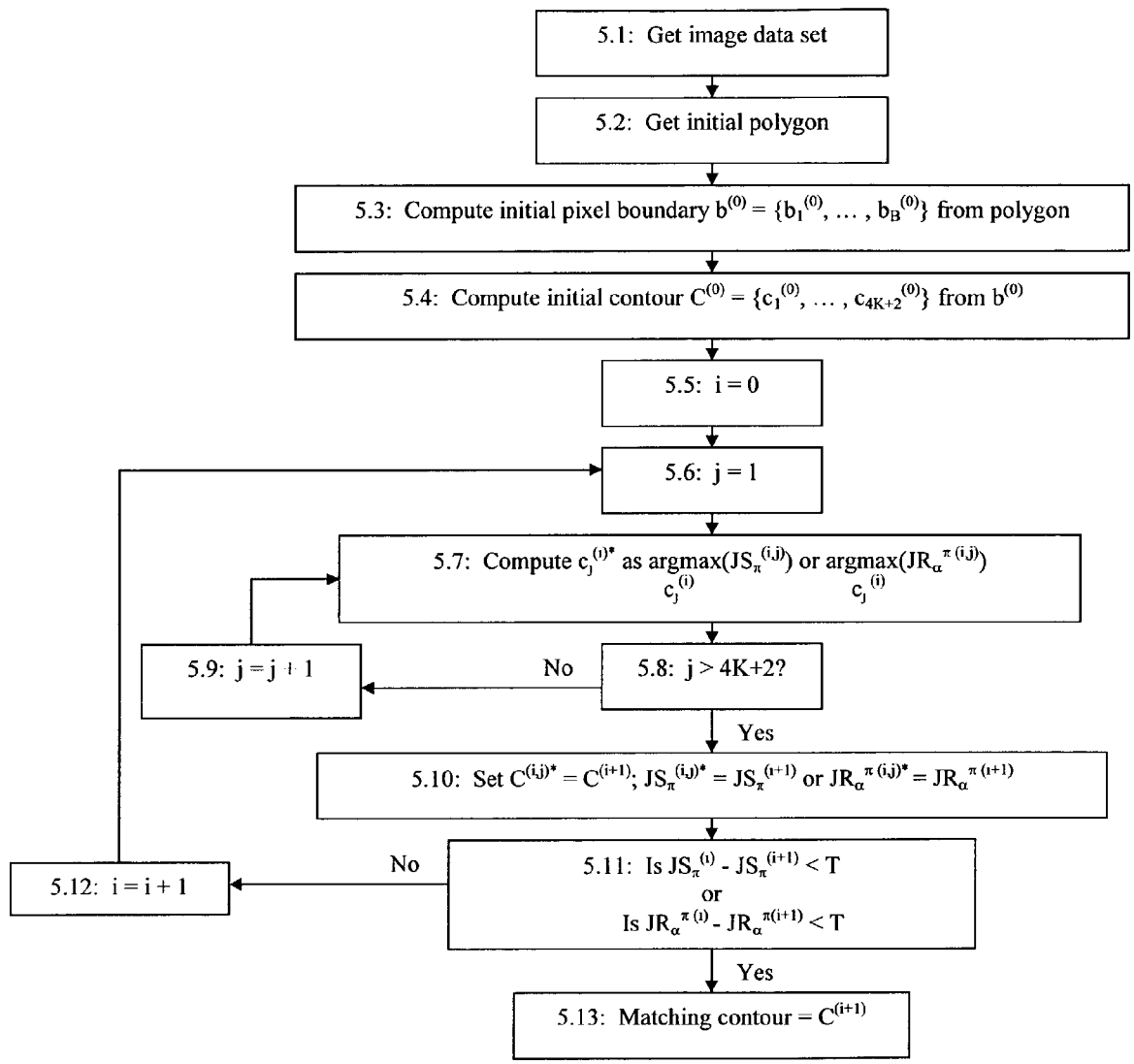
FIG. 5 is a flowchart for the Jensen-Shannon divergence (JSD)/Jensen-Renyi divergence (JRD) image segmentation process of the present invention when a single object is contoured.

The program using the objective functions (41) or (43) for single object contouring is described in FIG. 5. Multiple object contouring using objective functions (42) or (44) is described in FIG. 6. Both the JSD and the JRD can maximized by the same schemes, given in detail here.

The single contour program is initialized with an image (step 5.1) and an initial boundary estimate, preferably a polygon created either by the operator or by the program itself (step 5.2). The polygon is converted to the initial pixel boundary vector $b^{(0)}$ with $B_0$ pixel-contiguous elements $b_1^{(0)}, \ldots, b_2^{(0)}, \ldots b_{80}^{(0)}$. Each element contains the row and column coordinates of the contour pixel as $b_j^{(0)}=$(row j, column j). From these pixels, the coefficients for the initial parametric contour $C^{(0)}$ are computed (see (8) through (11)).

Contour determination proceeds through two loops. The outer loop (steps 5.6–5.12) iterates over successive versions of the parametric contour $C^{(0)}, C^{(1)}, \ldots, C^{(i)}, \ldots$, stopping when the increases between succeeding values of the JSD (or JRD) fall below a pre-selected, threshold minimum T. So, if $$JS_\pi^{(i+1)} - JS_\pi^{(i)} < T \qquad (45)$$

or $$JR_\alpha^{\pi(i+1)} - JR_\alpha^{\pi(i)} < T \qquad (46)$$

then the program reports the contour $C^{(i+1)}$ and stops (step 5.13). As would be appreciated by those of ordinary skill in the art, the choice of a value for T is up to the practitioner of the invention, with smaller values of T providing higher accuracy but requiring more time to compute. The inventor herein has found that a value in the range of 0.001 to 0.1 is preferable for T.

The inner loop (steps 5.7–5.9) maximizes the JSD (or JRD) over the components of the current contour $C^{(i)}$. This maximization can be done many ways (steepest descent, Quasi-Newton method, conjugate gradient descent, etc.), and preferably maximization is performed using Powell's direction set method or alternatively, the method of conjugate gradient descent with equivalently-accurate results. See Press, W H, Teukolsky, S A, Vettering, W T, and Flannery, B P, *Numerical Recipes in C++*, Second Edition, Cambridge University Press, Cambridge, UK, 2002; and Nocedal, J. and Wright, S. J., *Numerical Optimization* , Springer-Verlag, New York, 1999, the entire disclosures of which are incorporated herein by reference. It is worth noting that although the methods' names indicate minimization, minimizing the negative of the function locates the function's maximum.

Through the argmax function (step 5.7), the inner loop maximizes the JSD (or JRD) by systematically varying the numeric values of the individual parameters $c_1^{(i)}, c_2^{(i)}, \ldots, c_{4K+2}^{(i)}$, and noting the resulting values of $JS_\pi^{(i)}$ or $JR_\alpha^{\pi(i)}$, according to whichever of the maximization methods is used. At each inner-loop substep, trial (*) contours $C^{(i,j)*}$ (i-th iteration contour, j-th component being varied) are computed for each of the several values of the parameter $c_j^{(i)}$ (step 5.7). Each parametric contour is converted to its corresponding boundary $b^{(i,j)*}$, pixels in the zones $Z_{I(i,j)}^*$ and $Z_O^{(i,j)*}$ are enumerated, the conditional probability distributions $p(X|Z_I^{(i,j)*})$ and $p(X|Z_O^{(i,j)*})$ are computed, and the JSD or JRD entropy terms and divergences $JS_\pi^{(i,j)*}$ or $JR_{\alpha\pi}^{(i,j)*}$ are computed. The largest maximum $JS_\pi^{(i,j)}$ or $JR_{\alpha\pi}^{(i,j)*}$ for all j is relabeled $JS_\pi^{(i+1)}$ or $JR_{\alpha\pi}^{(i+1)}$ and submitted to the outer loop test, and the corresponding contour is saved as $C^{(i+1)}$. While it is preferred that the random variable X used in the program correspond to pixel intensity, other pixel properties can be used.

The order in which the contour coefficients are adjusted during optimization has an important effect on optimization. Like other Fourier representations, the low number coefficients affect the global properties while the higher coefficients represent the fine details. In the Fourier elliptic representation, contour coefficients 1 and 2 are the xy-centroid of the contour, coefficients 3–6 fix the overall size of the object, and all higher coefficients add successively finer details to the contour shape. Coefficient values for CT organs are largest for the centroid, and tend to have successively smaller values for increasing coefficient order. By optimizing the divergences over the coefficients in order, the global properties are fixed first which thereby produces an efficient and accurate approach to the maximum. Thus, as the program loops from step 5.7 through step 5.9 iteratively, the coefficient adjustments produce a series of new and monotonically increasing divergence values. The divergence value resulting after all coefficients have been adjusted is the divergence value that will be maximum and passed to the outer loop test.

Figure 6:
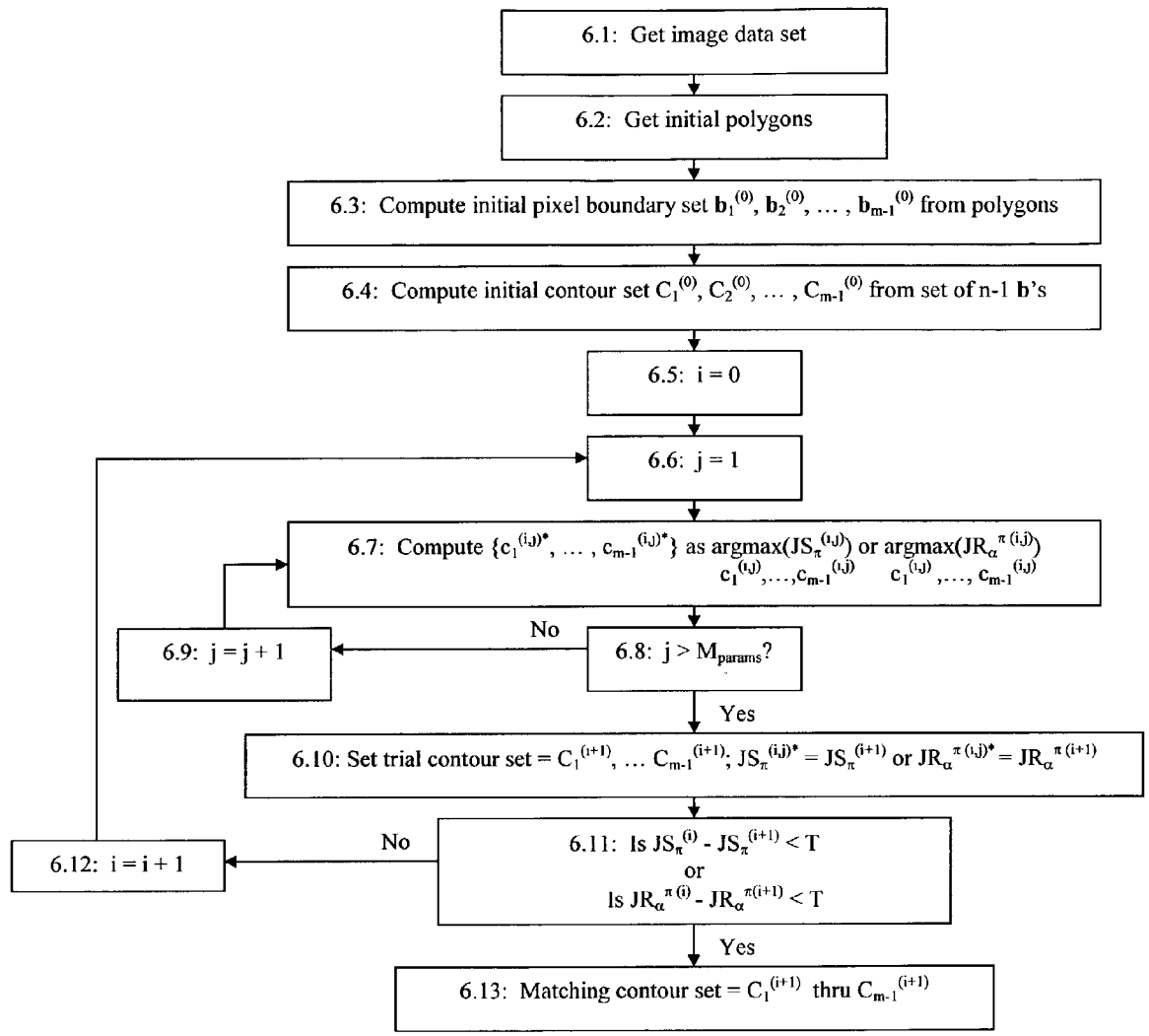
FIG. 6 is a flowchart for the JSD/JRD image segmentation process of the present invention when a multiple objects are contoured.

Referring to FIG. 6, the program which computes multiple contours simultaneously using the objective functions (42) or (44) is initialized with an image and m−1 polygons created either by the operator or by the program itself (steps 6.1 and 6.2). There are m regions including the common background region. Maximization of the JSD or the JRD for multiple object contours follows the same scheme as it does for single object contouring. The main difference between the optimization of multiple contours and a single contour is the re-ordering of the multi-contour coefficients for the optimization step.

The polygons are converted to a set of initial pixel boundary vectors $b_1^{(0)}, b_2^{(0)}, \ldots, b_{m-1}^{(0)}$ (step 6.3) from which the initial set of parametric contours $C_1^{(0)}, C_2^{(0)}, \ldots, C_{m-1}^{(0)}$ are computed (step 6.4). The subscripts refer to the regions/objects being contoured. The coefficient vectors for each contour are $$C_i^{(0)*} = (c_{i,1}^{(0)}, \ldots, c_{i,4k_i+2}^{(0)}) \tag{47}$$

where the first subscript for each coefficient identifies the contour and the second subscript identifies the coefficient's order. Also, each contour may have a different number of harmonics $K_i$.

Like the single contour program, optimization over a contour set has two nested loops. The outer loop (steps 6.6–6.12) iterates over optimized versions of the contour set, $$c_1^{(0)}, c_2^{(0)}, \ldots c_{m-1}^{(0)}$$
$$c_1^{(1)}, c_2^{(1)}, \ldots c_{m-1}^{(1)}$$
$$c_1^{(2)}, c_2^{(2)}, \ldots c_{m-1}^{(2)}$$
$$\vdots$$
$$c_1^{(i)}, c_2^{(i)}, \ldots c_{m-1}^{(i)} \tag{48}$$
$$\vdots$$

and the inner loop (steps 6.7–6.9) traverses all the coefficients in all the contours in the set. The convergence test for the outer loop is the same as that for the single contour program: stopping when the increases between successive values of the JSD (JRD) fall below a pre-selected, threshold minimum. So, if $$JS_\pi^{(i+1)} - JS_\pi^{(i)} < \text{threshold} \tag{49}$$

or $$JR_\alpha^{(i+1)} - JR_\alpha^{(i)} < \text{threshold} \tag{50}$$

then the program reports the contour set $C_1^{(i+1)}$ through $C_{m-1}^{(i+1)}$ as the matching contour set and stops (steps 6.11, 6.13).

For each pass of the outer loop, the inner loop maximizes the JSD (JRD) over all the contours' coefficients. The entire set of coefficients, ordered by contour, is $$\{c_1^{(i)}, c_2^{(i)}, \ldots, c_{m-1}^{(i)}\} = \{c_{1,1}^{(i)}, \ldots, c_{1,4K_1+2}^{(i)},$$
$$c_{2,1}^{(i)}, \ldots, c_{2,4K_2+2}^{(i)}, \ldots c_{m-1,1}^{(i)}, \ldots,$$
$$c_{m-1,4K_{m-1}+2}^{(i)}\} \tag{51}$$

where the subscripts are indexes for contour and coefficient, respectively, and there are $$M_{params} = \sum_{i=1}^{m-1}(4K_i + 2) \tag{52}$$

parameters in all contours. Because the Fourier elliptic representation orders the global parameters before the fine detail parameters, it is important to establish all the contours' global locations and sizes before determining the shape details for the contours. Therefore, we re-order the parameters in the set (51) by harmonic order as follows, $$\{c_1^{(i)}, c_2^{(i)}, \ldots c_{m-1}^{(i)}\} = \{c_{1,1}^{(i)}, c_{2,1}^{(i)}, \ldots, c_{m-1,1}^{(i)},$$
$$c_{1,2}^{(i)}, c_{2,2}^{(i)}, \ldots, c_{m-1,2}^{(i)},$$
$$c_{1,3}^{(i)}, c_{2,3}^{(i)}, \ldots, c_{m-1,3}^{(i)},$$
$$\vdots$$
$$c_{1,4K_1+2}^{(i)}, \ldots, c_{2,4K_2+2}^{(i)}, \ldots, c_{m-1,4K_{m-1}+2}^{(i)}\} \tag{53}$$

and where the contours have different numbers of coefficients, the order is filled in harmonic order by the remaining coefficients in the largest contour sets. If we re-label the re-ordered contours as singly-indexed parameters $\hat{c}_j^{(i)}$ in the set, $$\{c_1^{(i)}, c_2^{(i)}, \ldots, c_{m-1}^{(i)}\} = \{\hat{c}_1^{(i)}, \ldots, \hat{c}_j^{(i)}, \ldots, \hat{c}_{M_{params}}^{(i)}\} \tag{54}$$

we can describe the inner loop optimization just like that of the single contour program.

With reference to FIG. 3(c) and as noted above, a multi-processor computer can be used to carry out the contouring program of the present invention. For example, as shown in FIG. 3(c), the image data set can be provided to a plurality of processors 150a. For computations that do not depend on each other, increased processing speed can be obtained by splitting a problem into multiple independent parts and running each part on a different processor 150a. This would be especially the case where multiple object contouring is run on m regions in an image data set. Independent functions here include enumerating the region pixels, assembling the pixel feature histograms and distributions, and computing the Jensen or Renyi entropies and their weights. The processing required for each region can be performed on a separate processor 150a in parallel. The results of the parallel processing can then be collated in another processor 150a that would perform the outer loop test.

5. Demonstrations

Two sets of demonstrations are shown in FIGS. 7–10. The first set shows the action of the JRD contouring single figures in a series of random shapes with defined signal-to-noise ratios (SNRs). The second demonstration set shows the action of the JRD to contour anatomic objects in CT images.

Because the Jensen-Renyi divergence method consistently produced lower errors than the Jensen-Shannon divergence method in tests on random figures (described below) only demonstrations of the Jensen-Renyi method will be shown here.

Figure 7:
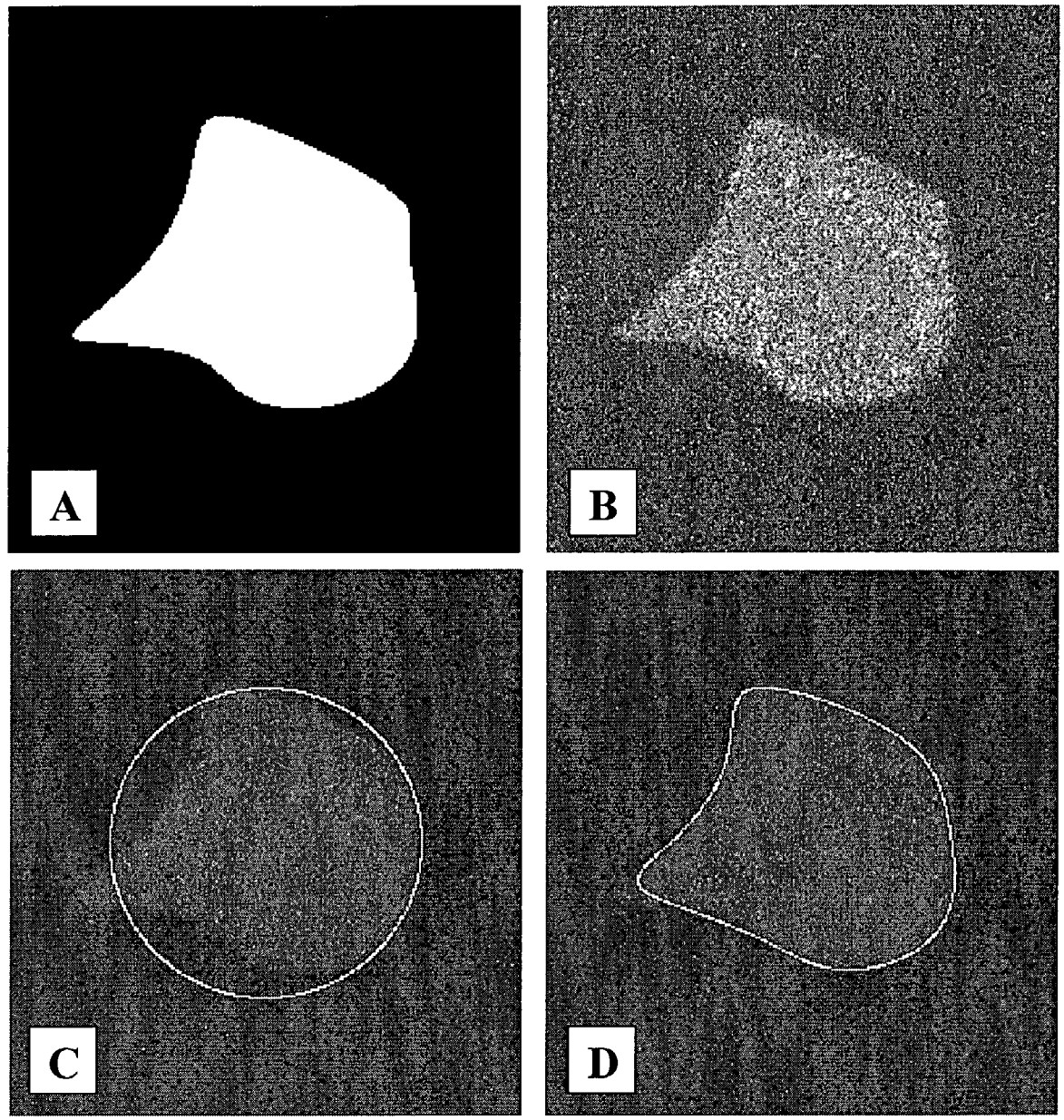
FIG. 7 depicts an example of JSD/JRD image segmentation performed on a random shape figure.

In the first demonstration of the action of the JRD, a estimation is performed for the contours in a series of random-shape figures defined by curves $C^{(true)} = \{c_1^{(true)}, c_2^{(true)}, \ldots, c_{4K+2}^{(true)}\}$ with known, but random, coefficients. This "true" boundary is designed to fill the center of a 256×256 image array, and to have somewhat sharper direction changes than usual in medical anatomy in CT. FIG. 7 shows the process: panel A is a figure template corresponding to a random shape figure, and panel B shows the shape of panel A smoothed with a 3×3 moving window and with Gaussian noise added, to the level of a SNR of about 3.0. Panel C shows a circle that serves as the initial contour estimate, and panel D shows the matching contour (white line) computed by the JRD and overlaid on the figure.

Figure 8:
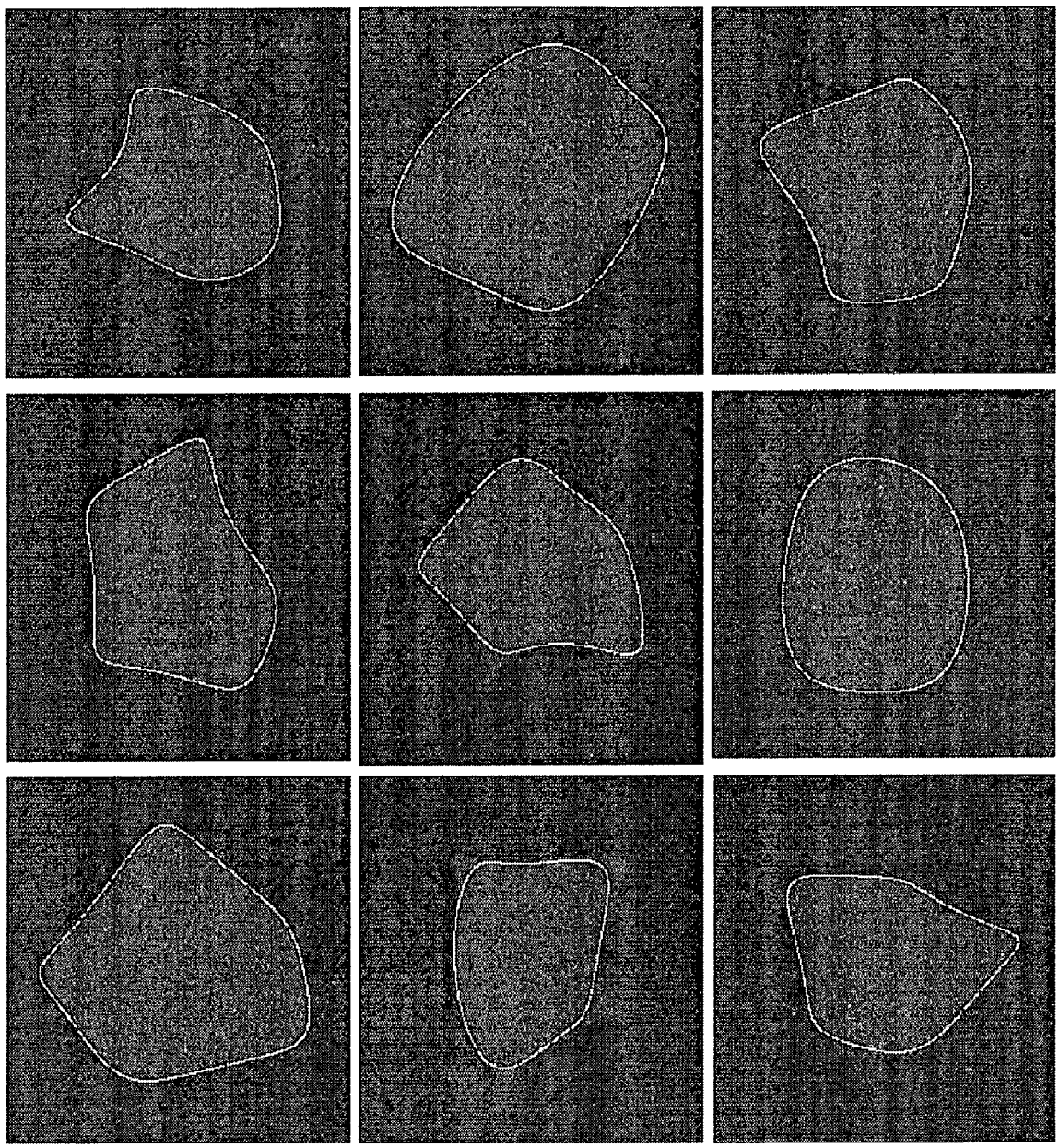
FIG. 8 depicts examples of JSD/JRD image segmentation performed on a various random shape figures.

FIG. 8 shows a series of randomly sized and shaped figures, with the JRD matching contours (white lines) computed from the circle initial estimate, and with SNR of about 3.0.

To compare the computed estimate contours with the true curves, the error is defined as the average distance between corresponding points in the two curves. The true, defined contour $C^{(true)}$ has a corresponding pixel boundary $b^{(true)}$ which is a vector of B-pixel coordinates as defined $b_1^{(true)}$ through $b_B^{(true)}$ where $b_i^{(true)} = (\text{row}_i, \text{column}_i)$. The contour estimates C* obtained using the JSD or the JRD produce a trial pixel boundary b* with B* coefficients. To make the two curves $b^{(true)}$ and b* commensurate, a comparison is made between intervals of points on the two curves, selected to sample both curves uniformly. The true boundary is divided into W equal intervals with $\hat{W}=B/W$ pixels per interval. For each $\hat{W}$-pixel interval in $b^{(true)}$, a $\hat{W}$-pixel interval in b* is selected, offset by a varying number of pixels in order to find that interval in b* closest to the fixed $b^{(true)}$ interval. The error is the average point-to-point distance for all points in all intervals $$\text{Error} = \frac{1}{B} \sum_{w=1}^{W} \left\{ \min_{1 \le j \le B^*} \left( \sum_{\substack{i \in w\text{-th interval} \\ \text{in } b^{(true)}}} \|b_i^{(true)} - b_{i+j}^*\| \right) \right\}. \tag{55}$$

In tests, the $b^{(true)}$–b* errors associated with the JSD technique, the JRD technique, and the known relative entropy technique consistently follow the order: Error(JRD) <Error(JSD)<25 Error(Relative Entropy). For example, the images in FIGS. 7 and 8 have SNR~3.5 and for the JSD/JRD contours have distance errors of 4–5 pixels. The relative entropy error distance for the same images is 5–7 pixels. Fuller quantization of these methods performance will follow shortly.

Figure 9:
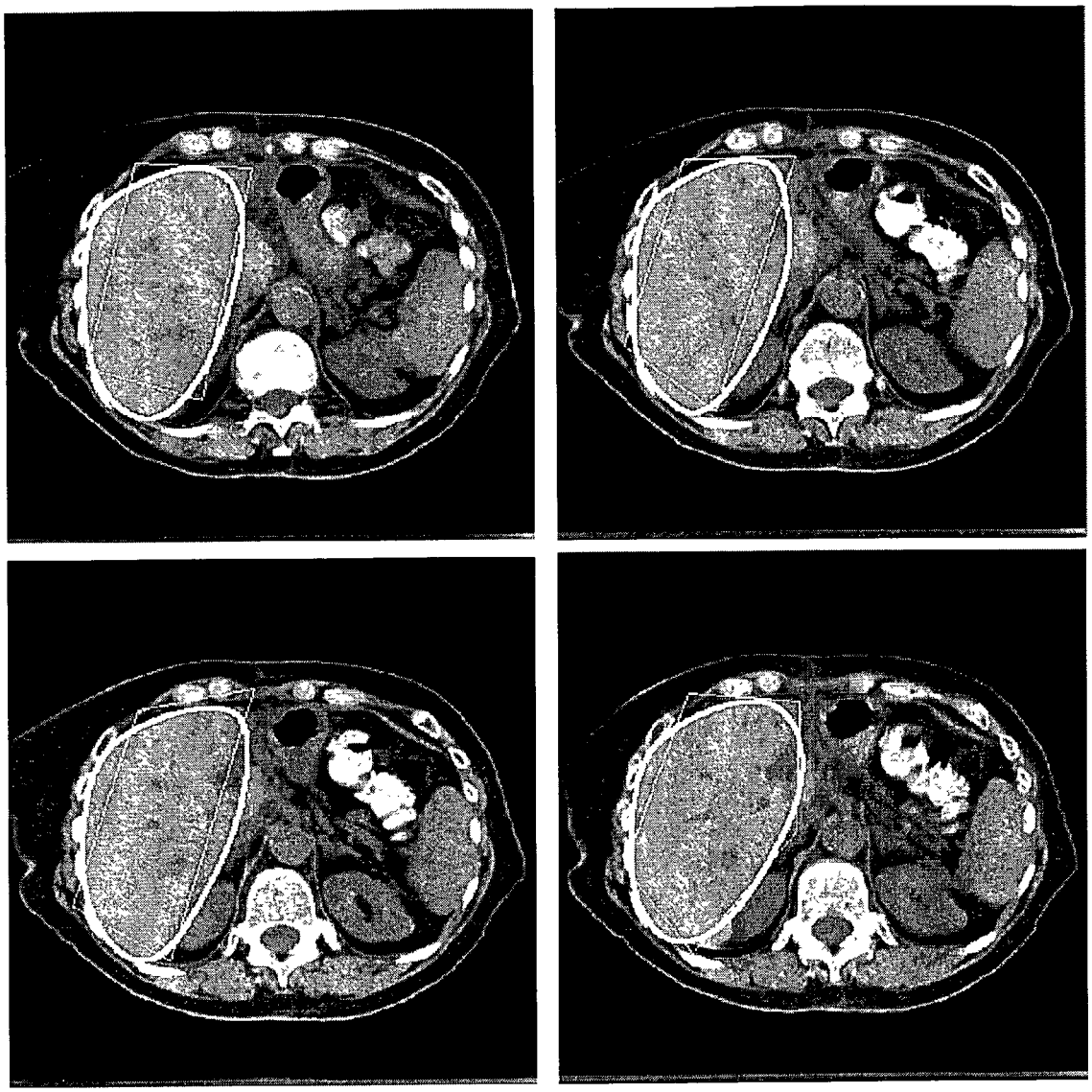
FIG. 9 depicts examples of JSD/JRD image segmentation performed on a series of CT images.

FIG. 9 shows the action of JRD contouring the liver of a patient in a series of CT sections of the abdomen. The thin lines indicate user-input polygons forming the initial estimates of the contours, and the thick white lines are the JRD matching contours. These matching contours were computed using 6 Fourier harmonics. The maximization is that given in equation (43).

FIG. 10 shows examples of multiple objects contoured by the JRD, simultaneously in the same picture. The maximization is that given in equation (44).

6. Additional Embodiments

The JSD/JRD image segmentation of the present invention can be based on multiple random variables rather than only a single random variable. JSD/JRD image segmentation can be applied to a random vector of properties, $X=(X_1, X_1, \ldots, X_d)$ in which each component $X_i$ is a discrete random variable. Better estimates of contours might be obtained by using more information encoded in multiple random variables than using just one random variable. The extent to which several random variables contain more information than any one alone depends on whether they are drawn from independent distributions. Extending the JSD/JRD methods to random vectors requires consideration of two cases: 1) the random variates $X_i$ are conditionally dependent, or 2) the random variates $X_i$ are mutually independent. Dependence is the more general situation, with independence a special case of the conditionally dependent case.

The probability distribution of a random vector is simply the joint distribution over the separate component random variables (see Grimmett and Stirzaker (1992))

$$p(X) = p(X_1, X_2, \ldots, X_d) \tag{56}$$
$$= p(X_1 = x_1, X_2 = x_2, \ldots, X_d = x_d)$$

where d is the dimension of the property vector. The distributions from which the individual variates are drawn may exhibit some inter-dependence, and this is expressed using the conditional probability, defined in ((1), (2)). The joint probability distribution may be written as a product of conditional probabilities, illustrated for these examples:

$$p(X_1, X_2) = p(X_1|X_2)p(X_2)$$
$$p(X_1, X_2, X_3) = p(X_1|X_2, X_3)p(X_2, X_3)$$
$$= p(X_1|X_2, X_3)p(X_2|X_3)p(X_3)$$
.
.
$$p(X_1, X_2, \ldots, X_d) = p(X_1|X_2, \ldots, X_d)p(X_2, \ldots, X_d)$$
$$= p(X_1|X_2, \ldots, X_d)p(X_2|X_3, \ldots, X_d)p(X_3, \ldots, X_d)$$
.
$$= p(X_1|X_2, \ldots, X_d)p(X_2|X_3, \ldots, X_d) \ldots p(X_d).$$

The joint probability distribution can be written more compactly as the product formula $$p(X_1, X_2, \ldots, X_d) = \prod_{i=1}^{d} p(X_i | X_{i+1}, X_{i+2}, \ldots, X_d). \quad (57)$$

If any one of the individual random variables $X_i$ is from a distribution independent of the distributions of other random variables $X_j$, $j \neq i$, the conditional distribution of $X_i$ relative to other variables is simply equal to its probability, without conditions. That is, $$p(X_i | \ldots, X_j, \ldots) = p(X_i) \quad (58)$$

for all $X_j$, $j \neq i$. In the case where all the random variables are mutually independent, the joint distribution is the product of the individual variates' probabilities, $$p(X) = p(X_1, X_2, \ldots, X_d) = \prod_{i=1}^{d} p(X_i). \quad (59)$$

If the variates are truly independent, not conditionally dependent, the decision rules for the relative entropy/LRT ((23), (40) 5.12), the JSD ((41), (42) 5.14) and the JRD ((43), (44) 5.15, 5.16) could simply be implemented as d parallel classifications with a rule to combine the separate decisions (see Devroye, 1996).

The multivariate LRT-equivalent relative energy decision rule from (23) is for the i-th variate If $D(p_x(X_i) \| p(X_i | H_2)) - D(p_x(X_i) \| p(X_i | H_1)) > T$, decide $H_1$, else $H_2$. (60)

and the overall decision for $H_1$, $H_2$ going to the outcome having the largest number of individual variate-decisions. In the case of even numbers of variates, tie votes would be always given to one outcome, say $H_1$. The multivariate relative entropy contour function (40) is rewritten $$c^* = \arg\max D(p(X|Z_1) \| p(X'|Z_0)) \quad (61)$$

where X, X' are the random property vectors for pixels inside and outside the contour c*. Rewriting the expression for the relative entropy, $$c^* = \operatorname{argmax}_c \left[ \sum_X p(X) \log \frac{p(X|Z_1)}{p(X'|Z_0)} \right]$$

$$= \operatorname{argmax}_c \left[ \sum_X p(X) \log \frac{p(X_1, \ldots, X_d | Z_1)}{p(X'_1, \ldots, X'_d | Z_0)} \right]$$

$$= \operatorname{argmax}_c \left[ \sum_X p(X) \log \frac{p(X_1|Z_1)p(X_2|Z_1)\ldots p(X_d|Z_1)}{p(X'_1|Z_0)p(X'_2|Z_0)\ldots p(X'_d|Z_0)} \right]$$

$$= \operatorname{argmax}_c \left[ \sum_X p(X) \sum_{i=1}^{d} \log \frac{p(X_i|Z_1)}{p(X'_i|Z_0)} \right]$$

$$= \operatorname{argmax}_c \left[ \sum_{X_1} \sum_{X_2} \ldots \sum_{X_d} p(X_1)p(X_2) \ldots p(X_d) \sum_{i=1}^{d} \log \frac{p(X_i|Z_1)}{p(X'_i|Z_0)} \right]$$

$$= \operatorname{argmax}_c \sum_{i=1}^{d} \sum_{X_i} p(X_i|Z_1) \log \frac{p(X_i|Z_1)}{p(X'_i|Z_0)}$$

which is the sum of individual-variate relative entropies, $$c^* = \operatorname{argmax}_c \left[ \sum_{i=1}^{d} D(p(X_i|Z_1) \| p(X'_i|Z_0)) \right] \quad (62)$$

So the best contour c* is the one for which the distributions $p(X_i|Z_1)$, $p(X_i|Z_0)$ are most different by their contributions to the sum of the individual-variate relative entropies.

The Jensen-Shannon divergence for multiple independent variates begins with a reconsideration of the equation for estimating a single contour (41) in which the multivariate random vectors X, X' have been substituted, $$c^* = \operatorname{argmax}_c JS_\pi \quad (63)$$

$$= \operatorname{argmax}_c [H_S(\pi_0 p(X'|Z_0) + \pi_1 p(X|Z_1)) -$$

$$\pi_0 H_S(p(X'|Z_0)) - \pi_1 H_S(p(X|Z_1))$$

Recall that the Shannon entropy for the distribution of a random variable X is $$H_S(p) = -\sum_{x \in X} p(X) \log p(X) \quad (64)$$

where the sum is taken over the domain of values on which X is defined. For the random vector X with independent random variable components, the entropy is $$H_S(p(X)) = \quad (65)$$

$$-\sum_{X_1} \sum_{X_2} \ldots \sum_{X_d} p(X_1) p(X_2) \ldots p(X_d) \log p(X_1) p(X_2) \ldots p(X_d)$$

where the sums are taken over the domains of the respective component random variables. Since the logarithm of a product is equal to the sum of the logs of the factors, $$H_S(p(X)) = -\sum_{X_1} \sum_{X_2} \ldots \sum_{X_d} p(X_1) p(X_2) \ldots p(X_d) \sum_{i=1}^{d} \log p(X_i) \quad (66)$$

and since independent variates sum only over their own domains, equation (66) can be rearranged to give $$H_S(p(X)) = \sum_{i=1}^{d} \left[ -\sum_{X_i} p(X_i) \log p(X_i) \right] \quad (67)$$

$$= \sum_{i=1}^{d} H_S(p(X_i))$$

where the entropy of the random vector is the sum of the independent, component variables' entropies. We can use (67) to rewrite equation (64) as follows, $$c* = \arg\max_c \left[ \sum_{i=1}^{d} H_S(\pi_0 p(X_i' | Z_0) + \pi_1 p(X_i | Z_1)) - \pi_0 \sum_{i=1}^{d} H_S(p(X_i' | Z_0)) - \pi_1 \sum_{i=1}^{d} H_S(p(X_i | Z_1)) \right]. \quad (68)$$

That is, the best contour estimate is obtained by the parameter set c for which the expression in the brackets is a maximum.

By analogy, we can write the equation corresponding to the multi-contour estimate given by equation (42) as $$\{c_1*, c_2*, \ldots c_{M-1}*\} = \quad (69)$$

$$\arg\max_{\{c_1, c_2, \ldots c_{M-1}\}} [JS_\pi(p_1(X), \ldots, p_M(X))] =$$

$$\arg\max_{\{c_1, c_2, \ldots c_{M-1}\}} \left[ H_S\left(\sum_{m=1}^{M} \pi_m p(X | Z_M)\right) - \sum_{m=1}^{M} \pi_m H_s(p(X | Z_m)) \right]$$

where the M regions are the background and the interiors for the M−1 contours. Using (67) we obtain an expression in terms of the individual random variables $X_i$ $$\{c_1*, c_2*, \ldots c_{M-1}*\} = \quad (70)$$

$$\arg\max_{\{c_1, c_2, \ldots c_{M-1}\}} \left[ \sum_{i=1}^{d} H_S\left(\sum_{m=1}^{M} \pi_M p(X_i | Z_M)\right) - \sum_{m=1}^{M} \pi_M \sum_{i=1}^{d} H_S(p(X_i | Z_M)) \right]$$

The Jensen-Renyi divergence has a similar development. Starting with the definition of the Renyi entropy of degree a from (24)

$$H_{R\alpha}(p) = \frac{1}{1-\alpha} \log \sum_{i=1}^{n} p(x_i)^\alpha \quad \alpha > 0, \quad \alpha \neq 1. \quad (71)$$

we substitute the random vector for the scalar random variable to obtain $$H_{R\alpha}(p(X)) = \quad (72)$$

$$\frac{1}{1-\alpha} \log \sum_{X_1} \sum_{X_2} \cdots \sum_{X_d} p(X_1)^\alpha p(X_1)^\alpha \cdots p(X_1)^\alpha =$$

$$\frac{1}{1-\alpha} \log \sum_{X_1} p(X_1)^\alpha \sum_{X_2} p(X_2)^\alpha \cdots \sum_{X_d} p(X_d)^\alpha$$

the log of a product of sums since the variables $X_i$ are independent. This can be simplified to $$H_{R\alpha}(p(X)) = \frac{1}{1-\alpha} \sum_{i=1}^{d} \log \sum_{X_i} p(X_i)^\alpha \quad (73)$$

$$= \sum_{i=1}^{d} \frac{1}{1-\alpha} \log \sum_{X_i} p(X_i)^\alpha$$

$$= \sum_{i=1}^{d} H_{R\alpha}(p(X_i))$$

where again the inner sum is over the domain of random variable $X_i$. Like the Shannon entropy, the Renyi entropy of a random vector is a sum of entropies of the independent, component random variables.

Now we consider the single contour JRD decision rule function given in equation (43), here substituted with the random vector X $$c* = \arg\max_c \; JR_\alpha^\pi(p_1, p_2) = \quad (74)$$

$$\arg\max_c [H_{R\alpha}(\pi_0 p(X | Z_0) + \omega \pi p(X | Z_1)) - \pi_0 H_{R\alpha}(p(X | Z_0)) - \pi_1 H_{R\alpha}(p(X | Z_1))]$$

and using (73), obtain an expression for the optimal contour on the separate independent variates, $$c* = \arg\max_c \; JR_\alpha^\pi(p_1, p_2) = \quad (75)$$

$$\arg\max_c \left[ \sum_{i=1}^{d} H_{R\alpha}(\pi_0 p(X_i | Z_0) + \pi_1 p(X_i | Z_1)) - \pi_0 \sum_{i=1}^{d} H_{R\alpha}(p(X_i | Z_0)) - \pi_1 \sum_{i=1}^{d} H_{R\alpha}(p(X_i | Z_1)) \right].$$

The JRD applied to M−1 simultaneous contours results when substituting the random vector X into equation (44)

$$\{c_1*, c_2*, \ldots, c_{M-1}*\} = \arg\max_{\{c_1, c_2, \ldots, c_{M-1}\}} [JR_\alpha^\pi(p_1, \ldots, p_M))] = \quad (76)$$

$$\arg\max_{\{c_1, c_2, \ldots c_{M-1}\}} \left[ H_{R\alpha}\left(\sum_{m=1}^{M} \pi_m p(X | Z_m)\right) - \sum_{m=1}^{M} \pi_m H_{R\alpha}(p(X | Z_m)) \right]$$

and using (73) we obtain an expression for the multiple simultaneous contours in terms of the independent variates, $$\{c_1*, c_2*, \ldots, c_{M-1}*\} = \qquad (77)$$

$$\arg\max_{\{c_1, c_2, \ldots, c_{M-1}\}} \left[ \sum_{i=1}^{d} H_{R\alpha}\left(\sum_{m=1}^{M} \pi_m p(X_i | Z_m)\right) - \sum_{m=1}^{M} \pi_m \sum_{i=1}^{d} H_{R\alpha}(p(X_i | Z_m)) \right].$$

This is the expression one would use to compute the M−1 contours based on the maximum of the JRD over the d features in each of the M regions.

In summary, it has been shown here the numerical formulas needed to compute contour estimates for the JSD/JRD methods, on image pixel properties represented as several random variables. The method and the accompanying formula is given in the following table.

| Method | Equation |
|---|---|
| JSD, single contour | 68 |
| JSD, multiple contours | 70 |
| JRD, single contour | 75 |
| JRD, multiple contours | 77 |

These are the formulas which, implemented in computer programs, can be used to compute contour estimates using multiple image pixel properties The above discussion of contour estimation using multiple random variables assumed that the variables were all statistically independent, or that the joint distribution is the product of the individual variate's unconditioned probabilities (equation (59)). The more general situation is given by equation (57) in which the variates are allowed to be from distributions which may be conditionally dependent. For the two variates $X_1$ and $X_2$, the joint probability $p(X_1, X_2)$ is related to the conditional probabilities by definition $$p(X_1, X_2) = p(X_1 | X_2) p(X_2) \qquad (78)$$
$$= p(X_2, X_1)$$
$$= p(X_2 | X_1) p(X_1).$$

The relative entropy for two distributions of these two random variables, $p(X_1, X_2)$ and $q(X_1, X_2)$ is given by $$D(p(X_1, X_2) \| q(X_1, X_2)) = \sum_{X_1} \sum_{X_2} p(X_1, X_2) \log \frac{p(X_1, X_2)}{q(X_1, X_2)} \qquad (79)$$
$$= \sum_{X_1} \sum_{X_2} p(X_1, X_2) \log \frac{p(X_1 | X_2)}{q(X_1 | X_2)} \frac{p(X_2)}{q(X_2)}$$

which is equivalent to the sum of relative entropies, $$D(p(X_1, X_2) \| q(X_1, X_2)) = \sum_{X_1} \sum_{X_2} p(X_1, X_2) \log \frac{p(X_1 | X_2)}{q(X_1 | X_2)} + \qquad (80)$$
$$\sum_{X_1} \sum_{X_2} p(X_1, X_2) \log \frac{p(X_2)}{q(X_2)}$$

or more compactly, $$D(p(X_1, X_2) \| q(X_1, X_2)) = D(p(X_1 | X_2) \| q(X_1 | X_2)) D(p(X_2) \| q(X_2)) \qquad (81)$$

which is equivalent to $$D(p(X_2, X_1) \| q(X_2, X_1)) = D(p(X_2 | X_1) \| q(X_2 | X_1)) D(p(X_1) \| q(X_1)) \qquad (82)$$

Computing these relative entropies can be done by literally using equation (80) to form the sums of ratios across the rows or columns of the joint distributions $p(X_1, X_2)$ and $q(X_1, X_2)$. This is considerably more complicated than computing the sum of relative entropies for the independent variates given in equation (62), and would have to be repeated for each iteration of the search for the contour's coefficients. And the complications multiply as one adds more random variables to the problem. However, given the speed and memory of current computers, such computations are only lengthy, not impossible. The JSD/JRD image segmentation technique of the present invention is also applicable to non-stationary data. "Non-stationary" applies to pixel data in which random variable means, variances, and distributions vary across the image of a single logical object. Classifiers which depend on a fixed mean and variance (e.g., the multivariate Gaussian model described in Section 2) to sort pixels into one or another objects pictured can produce higher error rates for non-stationary image data.

Since the JSD/JRD methods use functions of the random variables' distributions, it is possible that these methods may be more robust than parametric models since the JSD/JRD functions operate by portioning the data by distribution differences, regardless of any parameters that might be used to describe the distributions. During iterative region contour estimation, non-stationary data would produce small, continuous changes in the region data distributions, and such changes need not increase the error in the JSD/JRD auto-segmentation.

Further still, the JSD/JRD image segmentation discussed above was a region-centered approach in which the decision rules operated on distributions of pixel properties. The teachings of the present invention are also applicable to an edge-centered approach in which the decision rules operate on intensity gradients. Edges represented by coherent, high-valued gradient-image pixels should maximize a decision rule that superimposes the contour C* on gradient maxima pixels. Edges contain the highest values in the gradient image so a rule which seeks to maximize the difference between edge-pixel distributions and all the other pixels should force the contour onto the gradient image maxima.

Figure 1:
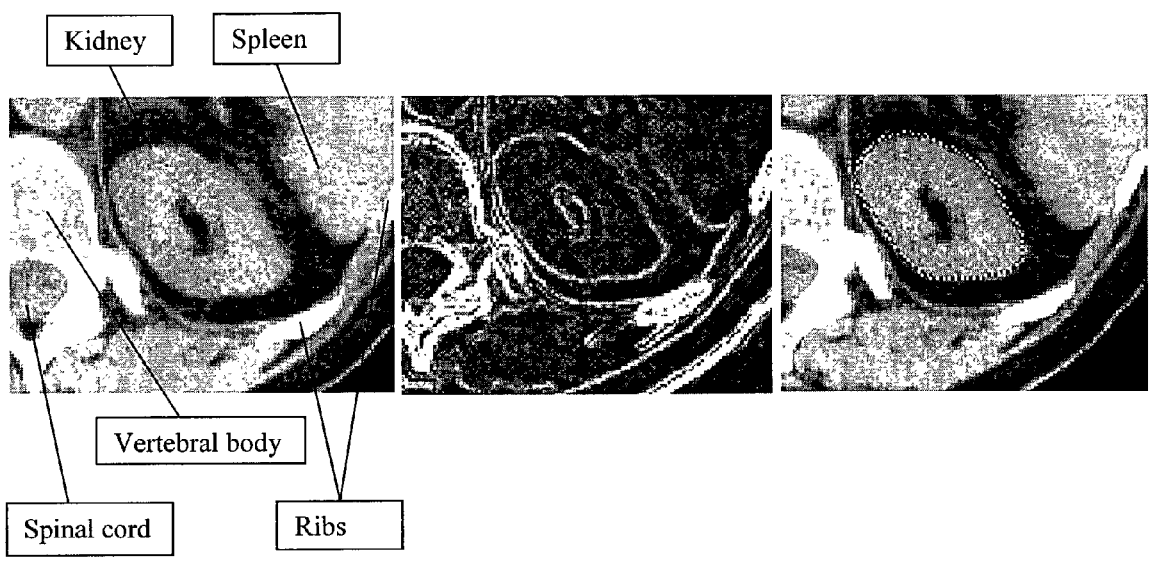
FIG. 1 is an exemplary CT digital image.

Thus, the present invention can be used in combination to (1) partition an object from a background (as previously described) and (2) separate the edge of the object, as observed in an image of the gray level gradient maxima (which is derived from the original image data set) by maximizing the JSD/JRD divergence between the pixels underneath contour $C^i$ and all other pixels in the gradient image. The center panel of FIG. 1 illustrates an example of a gradient image. Because the set of pixels coincident with an edge will necessarily have a distribution different from that of the gradient image background plus other object edges, maximizing the divergence over these two sets of gradient image pixels should add to the specificity of the boundary estimate produced in the regional divergence estimation.

Due to the fact that images are usually never simple, it is highly likely that the regional divergence and the edge divergence would be maximized for different $C^i$ contours. In such cases, the "matching contour" can be defined as the contour that jointly maximizes the combined divergences. Because the JSD/JRD divergences take on arbitrary real values determined by the data at hand, the regional and edge divergences for any given region in any given image might have very different values, thereby requiring a weighting to make them equivalent. Such a function would be expressed as:

$$F(JSD) = w_{region} JSD_{region}(C') + W_{edge} JSD_{edge}(C') \qquad (83)$$

or $$F(JRD) = W_{region} JRD_{region}(C') + w_{edge} JRD_{edge}(C') \qquad (84)$$

wherein $w_{region}$ and $w_{edge}$ are real number coefficients that can be set to equalize the contributions of the region and edge to the total divergence.

Further, combining separate JSD/JRD methods for the region pixel data and for edge pixel data could result in more accurate estimates of image object boundaries.

Also, restrictions on the pixel-classes segmented in the multiple, simultaneous segmentations by the JSD (42) and the JRD (44) might be used to obtain segmentations of like organs along with unlike organs. For instance, the kidneys might share a single distribution, so the rule would differentiate them collectively from the spleen, liver, stomach, or other organs. This is a kind of prior information which could improve the performance any above-described method.

Moreover, the present invention is also applicable to images having more than 2 dimensions. The present invention should work equally well in 3D as 2D, but would require flexible surfaces or volumes instead of a contour.

While the present invention has been described above in relation to its preferred embodiment, various modifications may be made thereto that still fall within the invention's scope, as would be recognized by those of ordinary skill in the art. For example, the invention has been described wherein the contouring program adjusts all coefficients of a contour in finding a maximal divergence value. However, given that the very high order coefficients have a relatively insignificant effect on the resulting contour (they add only very fine details), a practitioner of the present invention can modify the contouring program to adjust the numeric values of less than all of a contour's coefficients. While some accuracy would be lost, less processing power would be needed. Such modifications to the invention will be recognizable upon review of the teachings herein. As such, the full scope of the present invention is to be defined solely by the appended claims and their legal equivalents.

What is claimed is:

1. A method of identifying the boundary of an object in an image, the image being represented by a data set, the data set comprising a plurality of data elements, each data element having a data value corresponding to a feature of at least part of the image, the method comprising:
adjusting a boundary estimate at least partially according to one of the group consisting of a Jensen-Shannon divergence value corresponding to the boundary estimate and a Jensen-Renyi divergence value corresponding to the boundary estimate such that the boundary estimate substantially matches the object boundary.

2. The method of claim 1 wherein the divergence value represents a measure of the difference between the data values of the data elements located in a zone $Z_I$, and the data values of the data elements located in a zone $Z_O$, $Z_I$ and $Z_O$ being defined by the boundary estimate and representing, respectively, the data elements of the image located inside and outside the boundary estimate.

3. The method of claim 2 wherein each data value is any member of the data value set X', X' comprising a plurality of possible data values $x_1$ through $x_n$, and wherein each data value $x_i$ is the value of a random variable X drawn from X' according to a probability law $p(x_i) = \Pr\{X = x_i\}$, each zone having a corresponding probability law such that the probability of observing X with the specific value $x_i$ in zone $Z_O$ is the conditional probability $p(x_i|Z_O)$ and the probability of observing X with the specific value $x_i$ in zone $Z_I$ is the conditional probability $p(x_i|Z_I)$, and wherein the divergence value represents a measure of the difference between a conditional probability distribution $p(X|Z_I)$ and a conditional probability distribution $p(X|Z_O)$.

4. The method of claim 3 wherein X' comprises a finite plurality of possible data values.

5. The method of claim 3 wherein the boundary estimate is a contour C.

6. The method of claim 5 further comprising:
determining a contour that represents an approximation of the object boundary;
calculating one of the group consisting of the Jensen-Shannon divergence value and the Jensen-Renyi divergence for the contour; and
wherein the adjusting step comprises adjusting the approximate contour so as to increase its corresponding calculated divergence value.

7. The method of claim 6 further comprising:
receiving input from a user or from a programmed method corresponding to a polygon that represents an initial estimate of the object boundary;
mapping the received input to the image data set to thereby determine a pixel boundary corresponding to the polygon; and
wherein the approximate contour determining step comprises calculating the approximate contour from the determined pixel boundary.

8. The method of claim 6 wherein the divergence value calculating step comprises:
identifying which data elements are located in $Z_I$;
identifying which data elements are located in $Z_O$;
calculating the conditional probability distribution $p(X|Z_I)$;
calculating the conditional probability distribution $p(X|Z_O)$; and
calculating the divergence value between $p(X|Z_I)$ and $p(X|Z_O)$.

9. The method of claim 6 wherein the adjusting step further comprises adjusting the approximate contour so as to substantially maximize its calculated divergence value.

10. The method of claim 9 wherein each contour is a parametric contour C defined by functions of a plurality N of ordered contour coefficients $c_1$ through $C_N$, each contour coefficient $c_i$ having a numeric value, and wherein the adjusting step further comprises adjusting the numeric value of at least one contour coefficient $c_i$.

11. The method of claim 10 wherein the adjusting step furthercomprises determining a numeric value for $c_i$ of the approximate contour for which the divergence value of the approximate contour is substantially maximum.

12. The method of claim 11 wherein the adjusting step comprises performing the numeric value determining step for $c_i$ before performing a numeric value determining step for $c_{i+1}$.

13. The method of claim 10 wherein the adjusting step further comprises individually adjusting the numeric values of at least a plurality of approximate contour coefficients starting from $c_1$ and continuing through successively higher order approximate contour coefficients until the approximate contour's divergence value is substantially maximized.

14. The method of claim 13 wherein the individually adjusting step comprises individually adjusting the numeric values of each approximate contour coefficient starting from $c_1$ and continuing through successively higher order approximate contour coefficients to $c_N$ until the approximate contour's divergence value is substantially maximized.

15. The method of claim 13 wherein the coefficients correspond to the terms of a finite-length trigonometric series, wherein the number N of the contour coefficients is 4K+2, and wherein K is a programmably-determined number of harmonics of the trigonometric series.

16. The method of claim 2 wherein the divergence value is a Jensen-Shannon divergence value.

17. The method of claim 2 wherein the divergence value is a Jensen-Renyi divergence value.

18. The method of claim 2 wherein the image is a medical image of an interior portion of a body, wherein the data set comprises a plurality of pixels, each pixel having a pixel value corresponding to image intensity.

19. The method of claim 18 wherein the medical image is an X-ray computed tomography (CT) image.

20. The method of claim 18 wherein the medical image is an X-ray image.

21. The method of claim 18 wherein the medical image is a magnetic resonance image.

22. The method of claim 17 wherein the image comprises a plurality of objects, each object having a boundary, the method further comprising performing the adjusting step simultaneously for at least two of the image objects.

23. The method of claim 2 wherein the data set is a two-dimensional data set.

24. The method of claim 2 wherein each data element has a plurality of data values corresponding to different features of at least part of the image.

25. The method of claim 24 wherein the data values for each data element are conditionally dependent on which of $Z_I$ and $Z_O$ that they are located within.

26. The method of claim 24 wherein the data values for each data element are mutually independent with respect to their values drawn from a random source of data values.

27. An apparatus for identifying the boundary of an object in an image, the image being represented by a data set, the data set comprising a plurality of data elements, each data element having a data value corresponding to a feature of at least part of the image, the apparatus comprising:
a processor configured to adjust a boundary estimate at least partially according to one of the group consisting of a Jensen-Shannon divergence value corresponding to the boundary estimate and a Jensen-Renyi divergence value corresponding to the boundary estimate such that the boundary estimate substantially matches the object boundary.

28. The apparatus of claim 27 wherein the divergence value represents a measure of the difference between the data values of the data elements located in a zone $Z_I$ and the data values of the data elements located in a zone $Z_O$, $Z_I$ and $Z_O$ being defined by the boundary estimate and representing, respectively, the data elements of the image located inside and outside the boundary estimate.

29. The apparatus of claim 28 wherein each data value is any member of the data value set X', X' comprising a plurality of possible data values $x_i$ through $x_n$, and wherein each data value $x_i$ is the value of a random variable X drawn from X' according to a probability law $p(x_i)=Pr\{X=x_i\}$, each zone having a corresponding probability law such that the probability of observing X with the specific value $x_i$ in zone $Z_O$ is the conditional probability $p(x_i|Z_O)$ and the probability of observing X with the specific value $x_i$ in zone $Z_I$ is the conditional probability $p(x_i|Z_I)$, and wherein the divergence value represents a measure of the difference between a conditional probability distribution $p(X|Z_I)$ and a conditional probability distribution $p(X|Z_O)$.

30. The apparatus of claim 29 wherein X' comprises a finite plurality of possible data values.

31. The apparatus of claim 29 wherein the boundary estimate is a contour C.

32. The apparatus of claim 31 wherein the processor is further configured to:
determine a contour that represents an approximation of the object boundary;
calculate one of the group consisting of the Jensen-Shannon divergence value and the Jensen-Renyi divergence for the contour; and
adjust the approximate contour so as to increase its corresponding calculated divergence value.

33. The apparatus of claim 32 wherein the processor is further configured to:
receive input from a user or from a programmed method corresponding to a polygon that represents an initial estimate of the object boundary;
map the received input to the image data set to thereby determine a pixel boundary corresponding to the polygon; and
determine the approximate contour by calculating the approximate contour from the determined pixel boundary.

34. The apparatus of claim 32 wherein the processor is configured to calculate the divergence value by:
identifying which data elements are located in $Z_I$;
identifying which data elements are located in $Z_O$;
calculating the conditional probability distribution $p(X|Z_I)$;
calculating the conditional probability distribution $p(X|Z_O)$; and
calculating the divergence value between $p(X|Z_I)$ and $p(X|Z_O)$.

35. The apparatus of claim 32 wherein the processor is further configured to adjust the approximate contour so as to substantially maximize its calculated divergence value.

36. The apparatus of claim 35 wherein each contour is a parametric contour C defined by functions of a plurality N of ordered contour coefficients $c_1$ through $c_N$, each contour coefficient $c_i$ having a numeric value, and wherein the processor is further configured to adjust the approximate contour by adjusting the numeric value of at least one contour coefficient $c_i$.

37. The apparatus of claim 36 wherein the processor is further configured to adjust the approximate contour by determining a numeric value for $c_1$ of the approximate contour for which the divergence value of the approximate contour is substantially maximum.

38. The apparatus of claim 37 wherein the processor is further configured to adjust the approximate contour by performing the numeric value determining step for $c_i$ before performing a numeric value determining step for $c_{i+1}$.

39. The apparatus of claim 36 wherein the processor is further configured to adjust the approximate contour by individually adjusting the numeric values of at least a plurality of approximate contour coefficients starting from $c_1$ and continuing through successively higher order approximate contour coefficients until the approximate contour's divergence value is substantially maximized.

40. The apparatus of claim 39 wherein the processor is further configured to adjust the approximate contour by individually adjusting the numeric values of each approximate contour coefficient starting from $c_1$ and continuing through successively higher order approximate contour coefficients to $C_N$ until the approximate contour's divergence value is substantially maximized.

41. The apparatus of claim 39 wherein the coefficients correspond to the terms of a finite-length trigonometric series, wherein the number N of the contour coefficients is 4K+2 and wherein K is a programmably-determined number of harmonics of the trigonometric series.

42. The apparatus of claim 28 wherein the divergence value is a Jensen-Shannon divergence value.

43. The apparatus of claim 28 wherein the divergence value is a Jensen-Renyi divergence value.

44. The apparatus of claim 28 wherein the image is a medical image of an interior portion of a body, wherein the data set comprises a plurality of pixels, each pixel having a pixel value corresponding to image intensity.

45. The apparatus of claim 44 wherein the medical image is a computed tomography (CT) image.

46. The apparatus of claim 44 wherein the medical image is an X-ray image.

47. The method of claim 44 wherein the medical image is a magnetic resonance image.

48. The apparatus of claim 43 wherein the image comprises a plurality of objects, each object having a boundary, and wherein the processor is further configured to perform the contour adjustment simultaneously for at least two of the image objects.

49. The apparatus of claim 28 wherein the data set is a two-dimensional data set.

50. The apparatus of claim 28 wherein each data element has a plurality of data values corresponding to different features of at least part of the image.

51. The apparatus of claim 50 wherein the data values for each data element are conditionally dependent on which of $Z_I$ and $Z_O$ that they are located within.

52. The apparatus of claim 50 wherein the data values for each data element are mutually independent with respect to their values drawn from a random source of data values.

53. The apparatus of claim 28 wherein the processor is a workstation.

54. The apparatus of claim 28 wherein the processor is a digital signal processor (DSP).

55. The apparatus of claim 28 wherein the processor is an application-specific integrated circuit (ASIC).

56. The apparatus of claim 28 wherein the processor is a multi-processor computer.

57. The apparatus of claim 28 further comprising a medical imaging device in communication with the processor for generating the data set.

58. A method of approximating the boundary of an object in an image, the image being represented by a data set, the data set comprising a plurality of data elements, each data element having a data value corresponding to a feature of at least part of the image, the method comprising:
  determining which one of a plurality of contours most closely matches the object boundary at least partially according to a divergence value for each contour, the divergence value being selected from the group consisting of Jensen-Shannon divergence and Jensen-Renyi divergence.

59. The method of claim 58 wherein each contour $C^i$ defines a zone $Z_I^i$ and a zone $Z_O^i$, $Z_I^i$ representing the data elements inside the contour and $Z_O^i$ representing the data elements outside the contour, each zone having a corresponding probability distribution of data values for the data elements therein, and wherein the divergence value for each contour $C^i$ represents a measure of the difference between the probability distributions for the zones $Z_I^i$ and $Z_o^i$.

60. The method of claim 59 wherein each data value is any member of the data value set X', X' comprising a plurality of possible data values $x_1$ through $x_n$, and wherein each data value is the value of a random variable X drawn from X' according to a probability law $p(x_i)=\Pr\{X=x_i\}$, each zone having a corresponding probability law such that the probability of observing X with the specific value $x_i$ in zone $Z_O$ is the conditional probability $p(x_i|Z_O)$ and the probability of observing X with the specific value $x_i$ in the zone $Z_I$ is the conditional probability $p(x_i|Z_I)$, the method further comprising:
  determining a first contour $C^1$;
  calculating a conditional probability distribution $p(X|Z_I^1)$;
  calculating a conditional probability distribution $p(X|Z_O^1)$;
  calculating the difference between $p(X|Z_I^1)$ and $p(X|Z_O^1)$ according one of the group consisting of the Jensen-Shannon divergence and the Jensen-Renyi divergence;
  determining a second contour $C^2$;
  calculating a conditional probability distribution $p(X|Z_I^2)$;
  calculating a conditional probability distribution $p(X|Z_O^2)$;
  calculating the difference between $p(X|Z_I^2)$ and $p(X|Z_O^2)$ according to the one of the group consisting of Jensen-Shannon divergence and Jensen-Renyi divergence that was selected in the first difference calculating step; and
  wherein the match determining step comprises selecting the contour, $C^1$ or $C^2$, having a larger divergence value as the contour that most closely matches the object boundary.

61. The method of claim 60 wherein each contour $C^i$ is defined by a plurality N of ordered contour coefficients $c_1^i$ through $c_N^i$, each contour coefficient having a numeric value, and wherein the $C^2$ determining step comprises creating $C^2$ from $C^1$ by adjusting the numeric value of a $C^1$ contour coefficient.

62. The method of claim 61 wherein the $C^2$ determining step comprises creating $C^2$ from $C^1$ by adjusting the numeric value of each $C^1$ contour coefficient such that the divergence value of $C^2$ is greater than the divergence value for $C^1$.

63. The method of claim 62 further comprising repetitively performing the method steps until the difference between divergence values for $C^1$ and $C^2$ is less than a programmably-defined threshold, and wherein $C^2$ becomes $C^1$ on each new iteration of the method steps.

64. The method of claim 63 wherein, on a first iteration of the method steps, the $C^1$ determining step comprises creating $C^1$ from a user-specified pixel boundary.

65. The method of claim 63 wherein, on a first iteration of the method steps, the $C^1$ determining step comprises creating $C^1$ from a programmably-defined pixel boundary.

66. The method of claim 59 wherein the image is a medical image of an interior portion of the body.

67. The method of claim 59 wherein each difference calculating step comprises calculating the Jensen-Shannon divergence value.

68. The method of claim 59 wherein each difference calculating step comprises calculating the Jensen-Renyi divergence value.

69. The method of claim 59 wherein each data element has a plurality of data values corresponding to different features of the image.

70. The method of claim 69 wherein the data values for each data element are conditionally dependent on which of $Z_I$ and $Z_O$ that they are located within.

71. The method of claim 69 wherein the data values for each data element are mutually independent with respect to their values drawn from a random source of data values.

72. A method of segmenting an object from its background in an image, the image being represented by a data set, the data set comprising a plurality of data elements, each data element having a data value corresponding to a feature of at least part of the image, the method comprising:
  associating the data elements of the data set with either a zone $Z_I$ or a zone $Z_O$, $Z_I$ being an estimation of the object in the image, $Z_O$ being an estimation of the background in the image; and
  adjusting $Z_I$ and $Z_O$ at least partially according to one of the group consisting of a Jensen-Shannon divergence value and a Jensen-Renyi divergence value such that $Z_I$ substantially matches the object.

73. The method of claim 72 wherein the divergence value is a measure of the divergence between a probability distribution of the data values of the data elements associated with $Z_I$ and a probability distribution of the data values of the data elements associated with $Z_O$.

74. The method of claim 73 wherein each data value is any member of a data value set X', X' comprising a plurality of possible data values $x_1$ through $x_Q$, and wherein each data value $x_i$ is the value of a random variable X drawn from X' according to a probability law $p(x_i)=Pr\{X=x_i\}$, each zone having a corresponding probability law such that the probability of observing X with the specific value $x_i$ in zone $Z_O$ is the conditional probability $p(X_i|Z_O)$ and the probability of observing X with the specific value $x_i$ in zone $Z_I$ is the conditional probability $p(x_i|Z_I)$, and wherein the method further comprises:
  calculating a conditional probability distribution $p(X|Z_I)$;
  calculating a conditional probability distribution $p(X|Z_O)$;
  calculating the divergence value as the divergence between $P(X|Z_I)$ and $p(X|Z_O)$.

75. The method of claim 74 wherein the adjusting step comprising adjusting $Z_I$ and $Z_O$ such that the calculated divergence value is substantially maximum.

76. The method of claim 75 further comprising:
  determining a boundary estimate, the boundary estimate defining $Z_I$ and $Z_O$;
  and wherein the adjusting step comprises adjusting the boundary estimate.

77. The method of claim 76 wherein the boundary estimate is a parametric contour C comprising a plurality N of ordered contour coefficients $c_1$ through $C_N$, each contour coefficient having a numerical value, and wherein the adjusting step comprises adjusting the contour coefficients so as to maximize the divergence value for C.

78. The method of claim 77 wherein the adjusting step comprises first adjusting only contour coefficient $c_1$ until the calculated divergence value for the adjusted contour is substantially maximum.

79. The method of claim 78 wherein the adjusting step further comprises next adjusting only contour coefficient $c_2$ until the calculated divergence value for the adjusted contour is substantially maximum.

80. The method of claim 79 wherein the adjusting step further comprises performing the contour coefficient adjusting step for successively higher ordered contour coefficients until the calculated divergence value does not differ from a previous calculated divergence value by more that a predetermined threshold value.

81. The method of claim 73 wherein the divergence value is the Jensen-Shannon divergence value.

82. The method of claim 73 wherein the divergence value is the Jensen-Renyi divergence value.

83. The method of claim 73 wherein the image is a medical image.

84. A method of segmenting an object in an image through optimization of a segmentation estimate, the image being represented by a data set, the data set comprising a plurality of pixels, each pixel having a value corresponding to a feature of at least part of the image, each pixel value being any member of the pixel value set X', X' comprising a plurality of possible pixel values $x_1$ through $x_n$, the segmentation estimate defining a zone $Z_I$ representing a set of pixels corresponding to the object and a zone $Z_O$ representing a set of pixels not corresponding to the object, wherein a plurality of pixels are located in $Z_I$ and a plurality of pixels are located in $Z_O$, the method comprising using one of the group consisting of (1) a Jensen-Shannon divergence value representing the difference between a probability distribution $p(X|Z_I)$ and a probability distribution $p(X|Z_O)$ and (2) a Jensen-Renyi divergence value representing the difference between a probability distribution $p(X|Z_I)$ and a probability distribution $p(X|Z_O)$ as a criterion for optimizing the segmentation estimate to substantially match the object boundary.

85. The method of claim 84 wherein the divergence value criterion is the Jensen-Shannon divergence value.

86. The method of claim 84 wherein the divergence value criterion is the Jensen-Renyi divergence value.

87. The method of claim 84 wherein the image is a medical image of an interior portion of the body.

88. The method of claim 84 wherein the segmentation estimate corresponds to a contour C that represents an approximation of the object boundary.

* * * * *